(12) United States Patent
Okamoto et al.

(10) Patent No.: US 7,835,993 B2
(45) Date of Patent: Nov. 16, 2010

(54) LICENSE MANAGEMENT DEVICE AND METHOD

(75) Inventors: Ryuichi Okamoto, Osaka (JP); Takuji Hiramoto, Osaka (JP); Atsunori Sakurai, Osaka (JP)

(73) Assignee: Panasonic Corporation, Osaka (JP)

( * ) Notice: Subject to any disclaimer, the term of this patent is extended or adjusted under 35 U.S.C. 154(b) by 346 days.

(21) Appl. No.: 11/995,471

(22) PCT Filed: Jul. 11, 2006

(86) PCT No.: PCT/JP2006/313789

§ 371 (c)(1),
(2), (4) Date: Jan. 11, 2008

(87) PCT Pub. No.: WO2007/007764

PCT Pub. Date: Jan. 18, 2007

(65) Prior Publication Data

US 2009/0151000 A1     Jun. 11, 2009

(30) Foreign Application Priority Data

Jul. 14, 2005    (JP)   ............................. 2005-206124

(51) Int. Cl.
*G06F 21/00*   (2006.01)

(52) U.S. Cl. ........................... 705/59; 705/51; 713/182; 713/189; 713/176; 713/193; 709/229; 709/203; 709/219; 709/225; 709/218; 380/278; 380/279; 380/281; 380/283; 380/284

(58) Field of Classification Search .................. 705/51, 705/59; 713/176, 182, 189, 173; 709/203, 709/218, 219, 225, 229

See application file for complete search history.

(56) References Cited

U.S. PATENT DOCUMENTS 5,138,712 A * 8/1992 Corbin ........................ 726/30
6,915,434 B1 7/2005 Kuroda et al.

(Continued)

FOREIGN PATENT DOCUMENTS

EP           1 492 040      12/2004

(Continued)

OTHER PUBLICATIONS

International Search Report issued Oct. 31, 2006 in the International (PCT) Application of which the present application is the U.S. National Stage.

(Continued)

*Primary Examiner*—Calvin L Hewitt, II
*Assistant Examiner*—Mamon Obeid
(74) *Attorney, Agent, or Firm*—Wenderoth, Lind & Ponack, L.L.P.

(57) ABSTRACT

Security is secured according to the type of a license so that unnecessary processing load is reduced. A license accumulation control unit (102) and a license transfer control unit (103) identifies a usage-rule type (204) which indicates whether or not a license (200) includes a usage rule (205) which requires updating each time a content is used, and encrypts the license (200) by using different encrypting methods depending on whether or not the usage rule (205) is included in the license (200). The license accumulation control unit (102) encrypts a content key: with a domain key when the license 200 does not include the usage rule (205); and with a license management device unique key, when the usage rule (205) is included, and accumulates the encrypted key in a license accumulation unit (110). The license transfer control unit (103), when the license (200) does not include the usage rule (205), reads the license (200) from the license accumulation unit (110) and transfers the license (200) with encryption maintained by using a license transfer unit (transfer method B) (105).

7 Claims, 21 Drawing Sheets

U.S. PATENT DOCUMENTS

| | | | |
|---|---|---|---|
| 7,239,873 B2 * | 7/2007 | Kawashima et al. | 455/435.1 |
| 7,343,495 B2 * | 3/2008 | Kambayashi et al. | 713/193 |
| 7,487,363 B2 * | 2/2009 | Alve et al. | 713/193 |
| 7,590,856 B2 * | 9/2009 | Morino et al. | 713/182 |
| 7,664,708 B2 * | 2/2010 | Stefik et al. | 705/59 |
| 2002/0002466 A1 * | 1/2002 | Kambayashi et al. | 705/1 |
| 2002/0023219 A1 * | 2/2002 | Treffers et al. | 713/176 |
| 2003/0005135 A1 * | 1/2003 | Inoue et al. | 709/229 |
| 2003/0009681 A1 * | 1/2003 | Harada et al. | 713/193 |
| 2003/0217279 A1 * | 11/2003 | Fuchigami et al. | 713/189 |
| 2004/0102987 A1 | 5/2004 | Takahashi et al. | |
| 2004/0193680 A1 * | 9/2004 | Gibbs et al. | 709/203 |
| 2004/0236697 A1 | 11/2004 | Nagao | |
| 2005/0071279 A1 * | 3/2005 | Asano | 705/57 |
| 2005/0210261 A1 * | 9/2005 | Kamperman et al. | 713/182 |
| 2006/0287956 A1 * | 12/2006 | Higashi et al. | 705/51 |
| 2007/0203839 A1 * | 8/2007 | Terauchi et al. | 705/51 |
| 2008/0163336 A1 * | 7/2008 | Feng et al. | 726/1 |
| 2008/0222258 A1 * | 9/2008 | Kwon et al. | 709/206 |
| 2008/0263624 A1 * | 10/2008 | Nakahara et al. | 726/1 |
| 2009/0010439 A1 * | 1/2009 | Okamoto et al. | 380/280 |

FOREIGN PATENT DOCUMENTS

| | | |
|---|---|---|
| EP | 1 630 998 | 3/2006 |
| JP | 2000-181803 | 6/2000 |
| JP | 2004-348286 | 12/2004 |
| WO | 03/081499 | 10/2003 |
| WO | 03/083746 | 10/2003 |
| WO | 03/098931 | 11/2003 |
| WO | 2004/109972 | 12/2004 |

OTHER PUBLICATIONS

Partial English translation (Figs. 1 & 2) of WO 03/081499, which was cited in the IDS filed Jan. 11, 2008.

* cited by examiner

License management information 300

| License ID | Number of times of update |
|---|---|
| 111111 | 0回 |
| 222222 | 2回 |
| 222223 | 3回 |
| ⋮ | ⋮ |

FIG. 5

License list 500

| License ID | Domain ID | Usage-rule type |
|---|---|---|
| 000011 | AAAAAA | Stateless |
| 000012 | BBBBBB | Stateful |

201 203 204

LICENSE MANAGEMENT DEVICE AND METHOD

TECHNICAL FIELD

The present invention relates to a management device of a license for reproducing copyrighted content and a method of the same.

BACKGROUND ART

In recent years, systems for distributing content of a digital copyrighted work, such as music, images and games, have been developed and some of the systems have entered a practical phase. Further, in distributing such content, a method of controlling use of content, which restricts an available period and number of times the distributed content can be reproduced and the like, has also been under consideration in view of copyright protection.

Conventionally, a server and plural terminals in a domestic network system (a home network) have been modeled such that the server distributes information including a usage rule and a content key which are necessary for using content (hereinafter the information referred to as "license") and that the terminals use the content to, for example, reproduce the content, by using the license distributed from the server.

Further, the license distributed from the server is held by each of the terminals. The terminal uses the content by using the license that the terminal holds. When accumulating a license, the terminal encrypts the license by using a unique key which is unique to the terminal, and accumulates the encrypted license. By doing this, even when the accumulated license is duplicated in other terminals, the duplicated license can not be decrypted. Accordingly, it is not possible to use the content by using the duplicated license. This enables secure copyright protection. Further, when transferring such license between plural terminals, the license is usually allowed to be transferred only within a certain area, and a transfer in an unrestricted area is not allowed in view of protection of content right and privacy protection for an owner of the terminal. It is usually considered that a transfer is allowed only between terminals owned by the same user.

As a conventional technique for achieving this, it has been considered that a single domain is set for plural terminals owned by the same user, and a domain key is generated for each domain and distributed to each of the terminals. When outputting the license outside, the terminal decrypts a code of the accumulated license which has been encrypted with the unique key. Then, the terminal encrypts it with the domain key and output it. Consequently, this license can be decrypted at terminals belonging to the same domain, but can not be decrypted at terminals not belonging to the same domain. As described above, it is achieved that, when two terminals belong to the same domain, the license is allowed to be transferred between the two terminals, but otherwise not allowed to be transferred (see Patent Reference 1, for example).

According to the conventional technique described above, when transferring a license between terminals, a source terminal encrypts the license with the domain key and then output it, and a destination terminal receives the license which is encrypted with the domain key as an input, decrypts it with the domain key and then use it. Here, in the case where the license is encrypted with the domain key at the source terminal, the license before the encryption is automatically deleted within the terminal at the time of the encryption.

Patent Reference 1: Japanese Unexamined Patent Application Publication No. 2000-181803

DISCLOSURE OF INVENTION

Problems that Invention is to Solve

However, the license which is encrypted with the domain key can be duplicated by a user any number of times. Furthermore, with regard to data transmission channels, a secure authenticated channel (hereinafter referred to as "SAC") is not established in transmitting the license to the destination terminal. Accordingly, an encrypted license obtained by duplication can be transmitted to the same destination terminal any number of times In such a case, there is no problem when a usage rule which does not require update (hereinafter referred to as "a stateless usage rule"), such as an available period for reproduction and the like, is set as a usage rule included in the license. However, when a usage rule which requires updating (hereinafter referred to as "a stateful usage rule"), such as the number of times of reproduction and the like, is set as a usage rule included in the license, a problem arises that reproduction is allowed over an originally allowed restriction.

For example, the following case may be considered: a license in which a usage rule is set as "a three-time reproduction is allowed" is encrypted with the domain key and outputted, and then transferred to an other terminal. At the destination terminal, when the outputted license encrypted with the domain key is inputted again into the destination terminal after the three-time reproduction of the content using the license, it may be possible to reproduce the content for further three times at the destination terminal.

Contrary to this, when the license is transmitted to the destination terminal within the domain, it is possible to prevent the same license from being transmitted to the same destination terminal over again, by establishing a safe authenticated channel using a SAC and the like, and controlling re-transmitting in transmitting the license. In this case, however, there is a problem that processing load on the terminal increases due to the processing of decrypting the license encrypted with the unique key, establishing the SAC and then transferring the license upon each transferring of the license.

The present invention presents a solution to the conventional problems described above. An object of the present invention is to provide a license management device and a method which: allow use of content only within an originally allowed area; and, at the same time, reduce unnecessary processing load such as establishing SAC, by switching security levels for copyright protection according to a type of the license.

Means to Solve the Problems

In order to solve the above described conventional problems, the license management device of the present invention manages a license which is information that indicates a right to use a content under a predetermined usage rule. The license management device includes: a license type identifying unit which identifies a license type that represents whether or not a license includes a usage rule which requires updating each time a content is used; and a license accumulation unit which performs different accumulation processing depending on whether or not the license includes a usage rule which requires updating each time a content is used.

The license management device may further include: a unique key holding unit which holds a unique key that is unique to the license management device; and a domain key holding unit which holds a domain key held in common with the device and an other license management device within a domain that consists of plural predetermined license management devices. The license accumulation unit may include an encryption unit which encrypts the license, as the accumulation processing: by using the unique key which is held by the unique key holding unit in a case where the license includes the usage rule which requires updating each time a content is used; and by using the domain key which is held by the domain key holding unit in a case where the license does not include the usage rule which requires updating each time a content is used.

The license management device may further include: a utilization unit which uses a content in accordance with the usage rule included in the license; and a license-type change determining unit which determines whether or not the license type identified by the license type identifying unit has changed due to the use of a content by the utilization unit. The encryption unit may, in a case where it is determined that the license type has changed, decrypt the license by using a key conforming to the type before the change, and then encrypt the license by using a key conforming to the type after the change.

The license management device may further include a secure management unit which includes a storage area in which information for preventing tampering with the license accumulated in the license accumulation unit is securely recorded. The license accumulation unit may record, on the secure management unit, the information for preventing tampering in the case where the license includes the usage rule which requires updating each time a content is used, and may not record, on the secure management unit, the information for preventing tampering in the case where the license does not include the usage rule which requires updating each time a content is used.

The license management device may further include: an updating unit which updates the usage rule included in the license each time a content is used, in the case where the license includes the usage rule which requires updating each time a content is used; and an updating number of times generating unit which generates information of the number of times of update each time the updating unit updates the usage rule which requires updating each time a content is used. The information of the number of times of update indicates the number of times that the license has been updated. The information for preventing tampering may be the information of updating number of times.

The license management device may further include: a secure transmitting and receiving unit which transmits and receives the license accumulated in the license accumulation unit by establishing a secure data transmission channel between an other license management device; a transmitting and receiving unit which transmits and receives the license accumulated in the license accumulation unit via a regular data transmission channel with the other license management device; a domain key holding unit which holds a domain key that is held in common with the device and the other license management device within a domain that consists of plural predetermined license management devices; and a transmitting and receiving control unit which controls transmitting and receiving the license with the other license management device. The license accumulation unit may encrypt the license by using the domain key and then accumulate the license, as the accumulation processing, in a case where the license does not include the usage rule which requires updating each time a content is used. The transmitting and receiving control unit may transmit and receive: the license by using the secure transmitting and receiving unit in the case where the license includes the usage rule which requires updating each time a content is used; and the license encrypted with the domain key by using the transmitting and receiving unit in the case where the license does not include the usage rule which requires updating each time a content is used.

Effects of the Invention

According to the present invention as described above, the license accumulation unit performs different accumulation processing depending on whether or not the license includes a usage rule which requires updating each time the content is used. More specifically, the license accumulation unit accumulates the license including a usage rule which requires updating each time the content is used, by performing accumulation processing which provides high security, but requires great processing load, since such a license requires high security. Contrary to this, the license which does not include the usage rule requiring update each time the content is used does not require as high security as the license which includes the usage rule requiring update each time the content is used does. Accordingly, it is possible to accumulate the license by accumulation processing requiring less processing load, since securing security of unnecessary level can be omitted. Consequently, the license management device of the present invention produces an advantage of achieving a license management which secures security for the license and reduces unnecessary processing load, by applying accumulation processing depending on the type of the license.

Further, the license accumulation unit of the present invention includes an encryption unit which, in the case where the license contains the usage rule requiring update each time the content is used, encrypts the license with the unique key held by the unique key storage unit, as the accumulation processing. The encryption unit encrypts the license with the domain key held by the domain key storage unit, in the case where the license does not contain the usage rule requiring update each time the content is used, as the accumulation processing. Accordingly, when transferring, within the domain, the license which does not include the usage rule requiring update each time the content is used, the license encrypted with the domain key can be read out from the license accumulation unit and transferred with encryption maintained. Consequently, a conventionally required processing can be omitted, which first decrypts the accumulated license encrypted with the unique key, and then encrypts the license with the domain key this time, before transfer. This provides an advantage of reducing processing load on the license management device.

Furthermore, the license accumulation unit of the present invention records tamper-resistant information on the secure management unit, in the case where the license includes the usage rule which requires updating each time the content is used, and does not record tamper-resistant information on the secure management unit, in the case where the license does not include the usage rule which requires updating each time the content is used. Accordingly, the tamper-resistant information is recorded on the secure management unit for the license requiring higher security, and is not recorded for the license which does not require such high security. Consequently, the license management device of the present invention can efficiently utilize the valuable storage area of the secure management unit for checking tampering of the license. Further, by setting the tamper-resistant information as update-number information, not as hash value, the amount of data of each of tamper-resistant information to be recorded on the secure management unit can be reduced from 16 bytes to 1 byte, providing an advantage that makes it possible to effectively utilize the valuable storage area of the secure management unit.

Furthermore, the transmitting and receiving control unit of the present invention transmits and receives: the license by using the secure transmitting and receiving unit, in the case where the license includes the usage rule which requires updating each time the content is used; and the license encrypted with the domain key by using the transmitting and receiving unit, in the case where the license does not include the usage rule which requires updating each time the content is used. Accordingly, the license requiring higher security is transferred using a secure data transmission channel which requires great processing load but provides high security, and the license not requiring higher security is encrypted with the domain key and transferred using regular data transmission channel. This provides an advantage of efficiently reducing processing load on the license management device when the license is transferred.

BRIEF DESCRIPTION OF DRAWINGS

FIG. 5 is a diagram illustrating an example of a license list 500.

NUMERICAL REFERENCES

Figure 1:
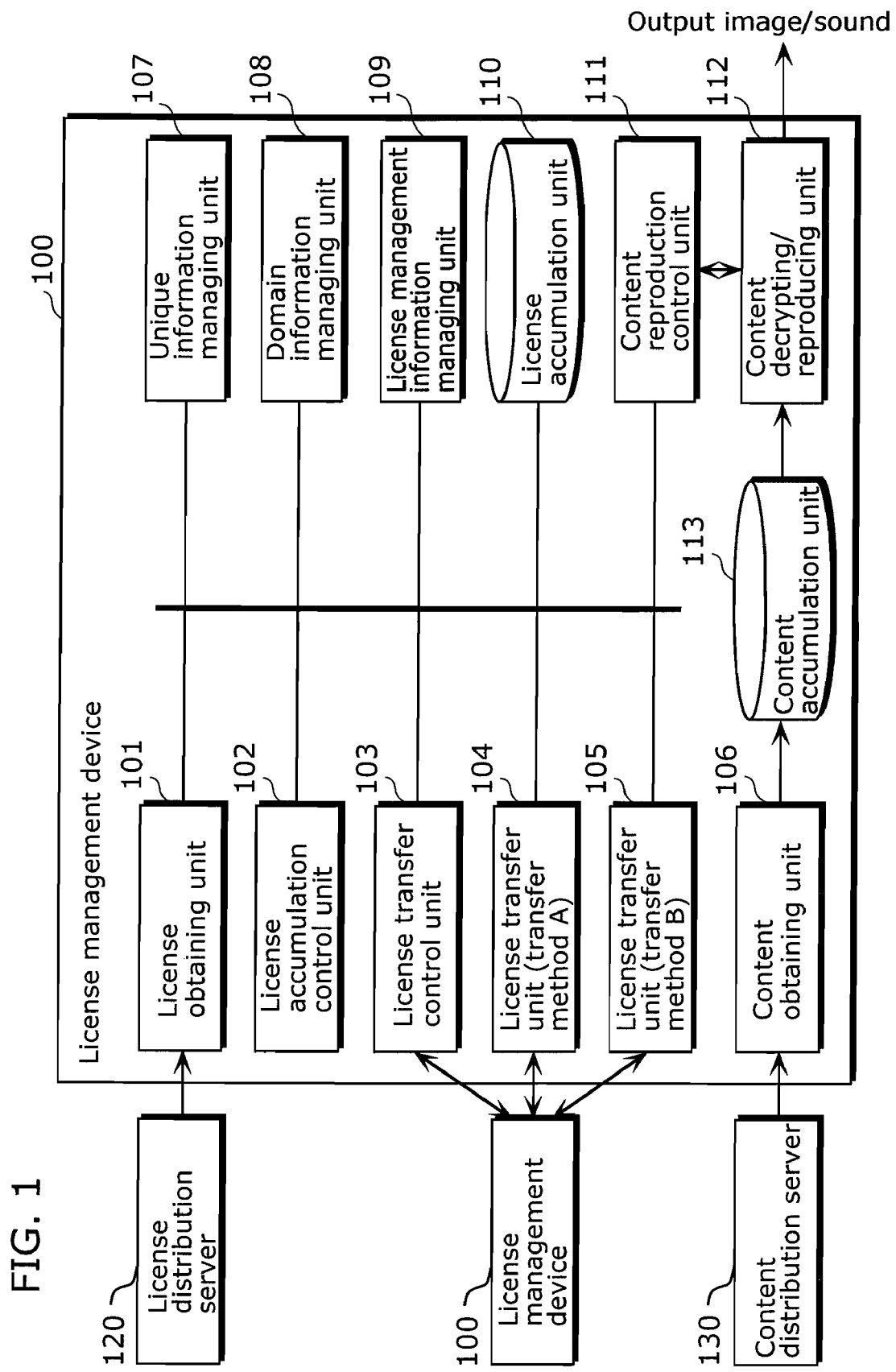
FIG. 1 is a block diagram illustrating a configuration of a license management device 100.

100 License management device
101 License obtaining unit
102 License accumulation control unit
103 License transfer control unit
104 License transfer unit (transfer method A)
105 License transfer unit (transfer method B)
106 Content obtaining unit
107 Unique information managing unit
108 Domain information managing unit
109 License management information managing unit
110 License accumulation unit
111 Content reproduction control unit
112 Content decrypting/reproducing unit
113 Content accumulation unit
120 License distribution server
130 Content distribution server
200 License
200 License ID
202 Content ID
203 Domain ID
204 Usage-rule type
205 Usage rule
206 Content key
300 License management information
301 Number of times of update
401 Tamper-resistant information
500 License list
1400 Transmission request for stateful license
1401 Identifier of transmission request for stateful license
1402 Domain-unique information
1500 Response to transmission request for stateful license
1501 Identifier of response to transmission request for stateful license
1502 Status code
1800 Transmission request for stateless license
1801 Identifier of transmission request for stateless license
1900 Response to transmission request for stateless license
1901 Identifier of response to transmission request for stateless license

BEST MODE FOR CARRYING OUT THE INVENTION

The license management device 100 according to an embodiment of the present invention will be described.

FIG. 1 illustrates an overall configuration of the license management device 100 according to an embodiment of the present invention. As illustrated in FIG. 1, the license management device 100 includes: a license obtaining unit 101; a license accumulation control unit 102; a license transfer control unit 103; a license transfer unit (transfer method A) 104; a license transfer unit (transfer method B) 105; a content obtaining unit 106; a content accumulation unit 113; a unique information managing unit 107; a domain information managing unit 108; a license management information managing unit 109; license accumulation unit 110; a content reproduction control unit 111 and a content decrypting/reproducing unit 112. Each of the constituent element of the license management device 100 will be described below.

Some of the functions of the license accumulation control unit 102 and the license transfer control unit 103 correspond to a license type identifying unit which identifies a license type that represents whether or not a license includes a usage rule which requires updating each time a content is used; and a license accumulation unit which performs different accumulation processing depending on whether or not the license includes a usage rule which requires updating each time a content is used.

The unique information managing unit 107 corresponds to a unique key holding unit which holds a unique key that is unique to the license management device. The domain information managing unit 108 corresponds to a domain key holding unit which holds a domain key held in common with the device and an other license management device within a domain that consists of plural predetermined license management devices. The license accumulation unit 110 corresponds to a license accumulation unit which accumulates the license encrypted by an encryption unit. The license accumulation control unit 102 corresponds to an encryption unit which encrypts the license, as the accumulation processing: by using the unique key which is held by the unique key holding unit in a case where the license includes the usage rule which requires updating each time a content is used; and by using the domain key which is held by the domain key holding unit in a case where the license does not include the usage rule which requires updating each time a content is used.

The content decrypting/reproducing unit 112 corresponds to a utilization unit which uses a content in accordance with the usage rule included in the license. The content reproduction control unit 111 corresponds to a license-type change determining unit which determines whether or not the license type identified by the license type identifying unit has changed due to the use of a content by the utilization unit and the encryption unit which, in a case where it is determined that the license type has changed, decrypts the license by using a key conforming to the type before the change, and then encrypts the license by using a key conforming to the type after the change.

The license management information managing unit 109 corresponds to a secure management unit which includes a storage area in which information for preventing tampering with the license accumulated in the license accumulation unit is securely recorded. The license accumulation control unit 102 corresponds to the license accumulation unit which records, on the secure management unit, the information for preventing tampering in the case where the license includes the usage rule which requires updating each time a content is used, and does not record, on the secure management unit, the information for preventing tampering in the case where the license does not include the usage rule which requires updating each time a content is used.

The content reproduction control unit 111 corresponds to: an updating unit which updates the usage rule included in the license each time a content is used, in the case where the license includes the usage rule which requires updating each time a content is used; and an updating number of times generating unit which generates information of the number of times of update each time the updating unit updates the usage rule which requires updating each time a content is used. The license management information 300 corresponds to the information of updating number of times, which is information for preventing tampering.

The license transfer unit (transfer method A) 104 corresponds to a secure transmitting and receiving unit which transmits and receives the license accumulated in the license accumulation unit by establishing a secure data transmission channel between an other license management device. The license transfer unit (transfer method B) 105 corresponds to a transmitting and receiving unit which transmits and receives the license accumulated in the license accumulation unit via a regular data transmission channel with the other license management device. The domain information managing unit 108 corresponds to a domain key holding unit which holds a domain key held in common with the device and an other license management device within a domain that consists of plural predetermined license management devices. The license accumulation unit 110 and the license accumulation control unit 102 correspond to the license accumulation unit which encrypts the license by using the domain key and then accumulates the license in a case where the license does not include the usage rule which requires updating each time a content is used. The license transfer control unit 103 controls transmitting and receiving the license with an other license management device. The license transfer control unit 103, in this control processing, corresponds to the transmitting and receiving control unit which transmits and receives: the license by using the secure transmitting and receiving unit in a case where the license includes the usage rule which requires updating each time a content is used; and the license by using the transmitting and receiving unit in the case where the license does not include the usage rule which requires updating each time a content is used.

The license obtaining unit 101 is a means of receiving a license 200 (illustrated in FIG. 2) from the license distribution server 120 and storing the license 200 into the license management device 100. It is assumed that the license 200 is transmitted from the license distribution server 120 via a wired transmission channel or a wireless transmission channel, such as the Internet, Cable Television (CATV) and broadcast wave and is encrypted. It is assumed that the license obtaining unit 101 decrypts the license 200 when storing the license 200 into the license management device 100. A decryption key to be used for decryption of the license 200 or information necessary to generate the decryption key is assumed to have been obtained, from the license distribution server 120, and held by the license obtaining unit 101.

Figure 2:
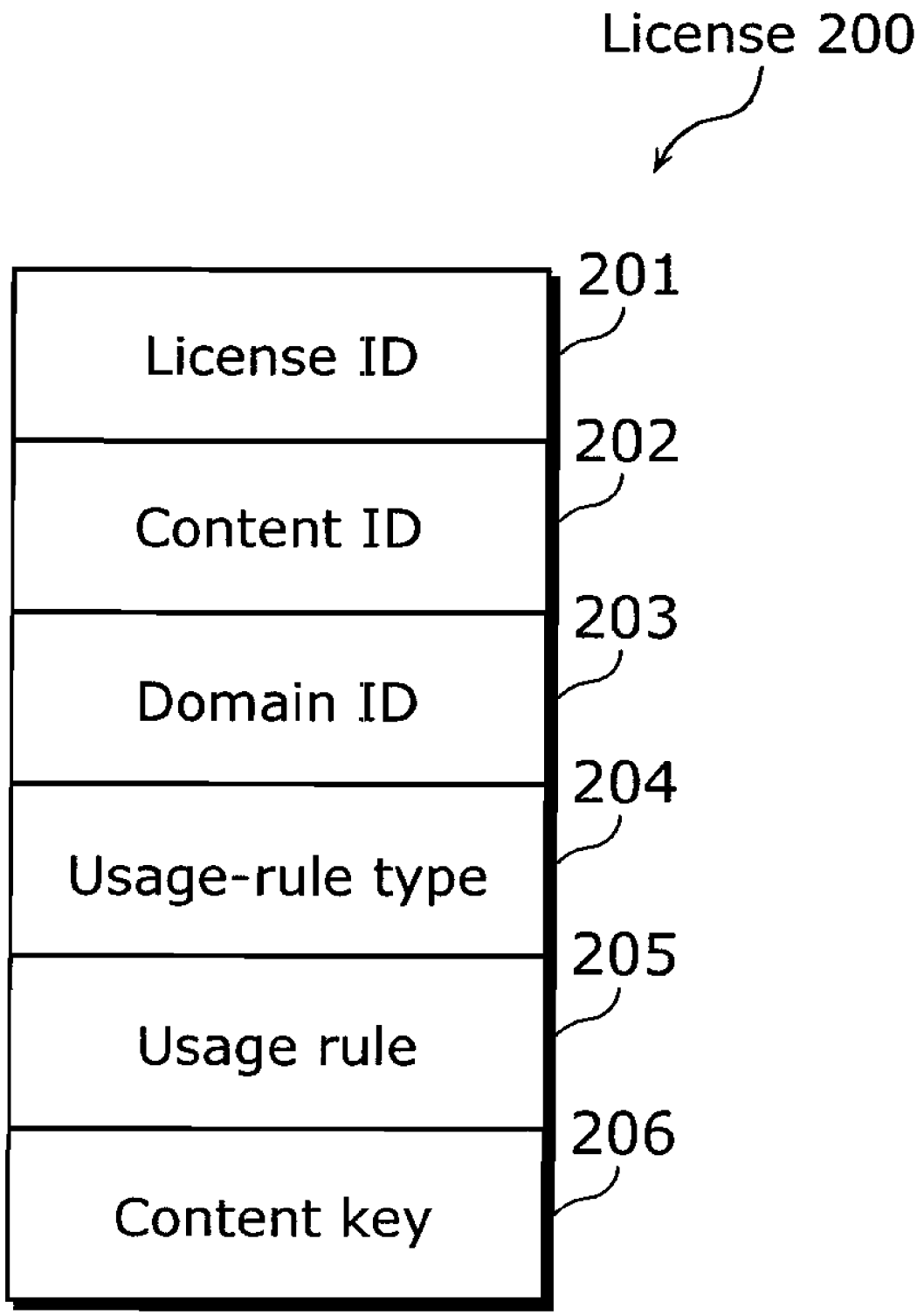
FIG. 2 is a diagram illustrating an example of a license 200.

The license 200 is information including at least: a license ID 201; a content ID 202; a domain ID 203; a usage-rule type 204; a usage rule 205; and a content key 206, as shown in FIG. 2. The license management device 100 reproduces content by using the license 200. An ID by which the license 200 is uniquely identified is written on the license ID 201. An ID of content to be reproduced by using the license 200 is written on the content ID 202. An ID of domain to which the license 200 can be transferred is written on the domain ID 203. A domain is a group of license management devices 100 to which the license 200 is allowed to be transferred. Each domain is provided with the domain ID 203 and a domain key which uniquely identify the domain. Information indicating a type of the usage rule 205 is written on the usage-rule type 204. In this embodiment, information indicating whether the usage rule 205 is a usage rule requiring update (hereinafter referred to as "a stateful usage rule") or a usage rule not requiring update (hereinafter referred to as "a stateless usage rule") is written on the usage-rule type 204. The stateful usage rule includes, for example, number of times of reproduction. The stateless usage rule includes, for example, an available period for reproduction. Rules for allowing use of content are written on the usage rule 205. The rules include the limit of the number of times for reproduction, the available period for reproduction, whether or not the license is transferable, and the like. A decryption key for decrypting the content is written on the content key 206.

Figures 3, 4:
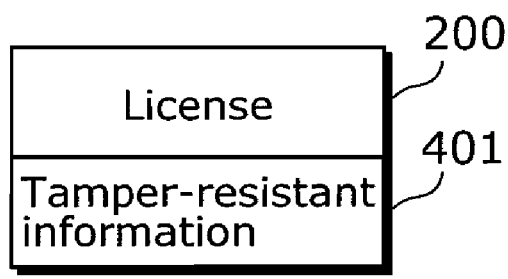
FIG. 3 is a diagram illustrating an example of license management information 300.
FIG. 4 is a diagram illustrating the license 200 stored in a license accumulation unit 110.

Referring back to FIG. 1, the license accumulation control unit 102 is a means of encoding the content key 206 of the license 200 which has been obtained by the license obtaining unit 101 and accumulating the license 200 in the license accumulation unit 110. In a case of the license 200 whose usage-rule type 204 is "the stateful usage rule", the license accumulation control unit 102 encrypts, before accumulating the license 200, the content key 206 by using a license management device unique key which is held by the unique information managing unit 107. On this occasion, information regarding the accumulated license 200 is recorded on the license management information 300 (illustrated in FIG. 3) which is managed by the license management information managing unit 109. FIG. 3 is a diagram illustrating an example of a data structure of the license management information 300. In FIG. 3, the number of times of update 301 is information indicating the number of times the usage rule 205 of the license 200 has been updated. In FIG. 3, it is shown that, for example, the license 200 whose license ID 201 is "111111" has never updated the usage rule 205; the license 200 whose license ID 201 is "222222" has updated the usage rule 205 twice; and the license 200 whose license ID 201 is "222223" has updated the usage rule 205 three times. In a case of the license 200 whose usage-rule type 204 is "the stateless usage rule", the license accumulation control unit 102 encrypts, before accumulating the license 200, the content key 206 by using a domain key which is held by the domain information managing unit 108. Note that the domain key of the domain identified by the domain ID 203 of the license 200 is selected for the domain key which is used for encryption.

FIG. 4 is a diagram illustrating the license 200 stored in the license accumulation unit 110. The license accumulation control unit 102 adds tamper-resistant information 401 to the license 200, as shown in FIG. 4, when accumulating the license 200 in the license accumulation unit 110. The tamper-resistant information 401 is calculated as follows. In a case of the license 200 whose usage-rule type 204 is "the stateful usage rule", the tamper-resistant information 401 is calculated as a hash value of data in which the number of times of update 301 and the license management device unique key are combined with the license 200 whose content key 206 has been encrypted by using the license management device unique key. In a case of the license 200 whose usage-rule type 204 is "the stateless usage rule", the tamper-resistant information 401 is calculated as a hash value for data where the domain key is attached to the license 200 whose content key 206 has been encrypted by using the domain key. Note that the hash value is calculated based on Secure Hashing Algorithm 256 (SHA-256) in this embodiment.

Referring back to FIG. 1, the license transfer control unit 103 is a means of controlling transfer of the license 200 between the license management device 100 in which the license transfer control unit 103 is included and other license management devices 100. More specifically, the license transfer control unit 103 transmits and receives a license list 500 (illustrated in FIG. 5) which is a list of licenses 200 managed by the license management device 100, and determines which of the license transfer unit (transfer method A) 104 or the license transfer unit (transfer method B) 105 should be used for transferring the license 200. FIG. 5 is a diagram illustrating an example of a data structure of the license list 500. Note that FIG. 5 indicates that the license management device 100 which has sent the license list 500 manages two licenses including: the license 200 which has license ID 201 of "000011", the domain ID 203 of "AAAAAA" and the usage-rule type 204 of "the stateless usage rule"; and the license 200 which has license ID 201 of "000012", the domain ID 203 of "BBBBBB" and the usage-rule type 204 of "the stateful usage rule".

The license transfer unit (transfer method A) 104 is a means for transferring the license 200 whose usage-rule type 204 is "a stateful usage rule". The license transfer units (transfer method A) 104 on a receiving side and on a transmitting side of the license 200 communicate with each other to establish a Secure Authenticated Channel (SAC) and then transfer the license 200.

The license transfer unit (transfer method B) 105 is a means of transferring the license 200 whose usage-rule type 204 is "the stateless usage rule". The license transfer units (transfer method B) 105 at a source and a destination of license transferring communicate with each other to transfer the license 200 whose content key 206 has been encrypted with the domain key.

The content obtaining unit 106 is a means of obtaining content from the content distribution server 130 and accumulates the content in the content accumulation unit 113. It is assumed that the content is transmitted from the content distribution server 130 via a wired transmission channel or a wireless transmission channel, such as the Internet, Cable Television (CATV) and broadcast wave, and encrypted in a manner that the content can be decrypted by using the content key 206 included in the license 200. Note that the content ID 202 is added to the content.

The content accumulation unit 113 is a means of accumulating content.

The unique information managing unit 107 is a means of managing information unique to the license management device 100 and includes: a license management device ID which uniquely identifies the license management device 100; and a license management device unique key which is unique to the license management device 100.

The domain information managing unit 108 is a means for managing information regarding a domain to which the license management device 100 belongs. The domain information managing unit 108 holds a combination of the domain ID 203 and the domain key of the domain to which the license management device 100 belongs. According to the present embodiment, the license management devices 100 which belong to the same domain commonly hold the same combination of the domain ID 203 and the domain key. In the case where the license management device 100 belongs to plural domains, the domain information managing unit 108 holds plural combinations of the domain ID 203 and the domain key.

The license management information managing unit 109 is a means of managing the license management information 300 which has been explained with reference to FIG. 3. The license management information managing unit 109 manages the license management information 300 in a tamper-resistant area to which a user can not access.

The license accumulation unit 110 is a means of accumulating the license 200.

The content reproduction control unit 111 is a means of controlling reproduction of content. More specifically, the content reproduction control unit 111 determines whether or not the content can be reproduced by referring to the usage rule 205 of the license 200. In the case where the content can be reproduced, the content reproduction control unit 111 decrypts the content key 206 and then transmits the decrypted content to the content decrypting/reproducing unit 112. Note that it is desirable to transmit the content key 206 from the content reproduction control unit 111 to the content decrypting/reproducing unit 112 after the SAC has been established.

The content decrypting/reproducing unit 112 is a means of decrypting the content accumulated in the content accumulation unit 113 by using the content key 206 received from the content reproduction control unit 111 and reproducing the decrypted content.

The configuration of the license management device 100 has been described above.

Next, operations of the license management device 100 in the present embodiment will be described with reference to flowcharts.

Figure 6:
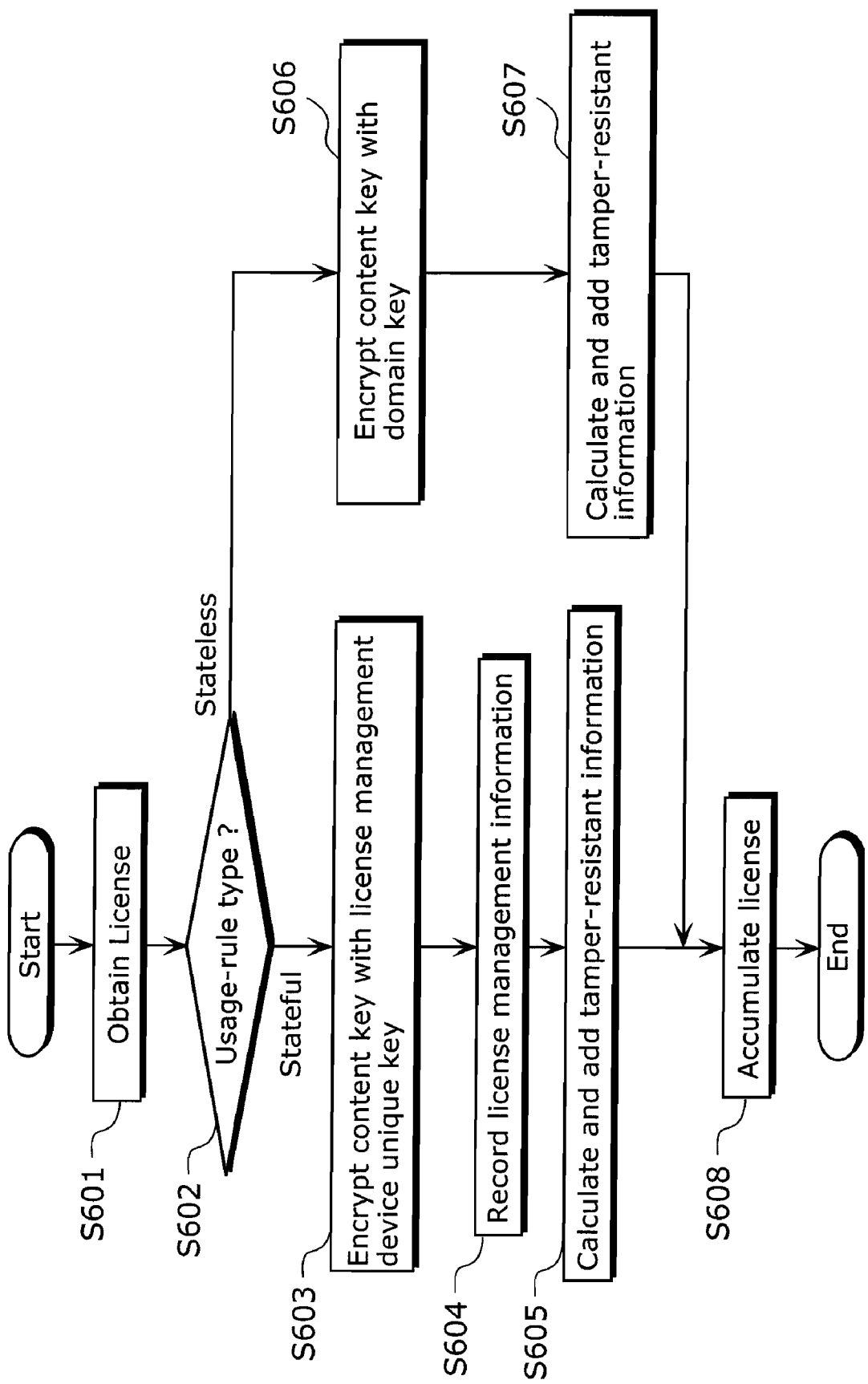
FIG. 6 is a flowchart illustrating operations of license accumulation processing.

FIG. 6 is a flowchart illustrating operations of license accumulation processing by the license obtaining unit 101 and the license accumulation control unit 102. First, the operations of license accumulation processing in the license management device 100 of the present embodiment will be described with reference to the flowchart of FIG. 6. In this processing, the license 200 is received from the license distribution server 120 and then stored into the license management device 100 for accumulation.

S601: the license obtaining unit 101 stores the license received from the license distribution server 120 into the license management device 100 and decrypts the stored license 200. Note that, the license obtaining unit 101 obtains and holds a decryption key to be used for decrypting the license 200 or information necessary for generating the decryption key in advance from the license distribution server 120.

S602: the license accumulation control unit 102 identifies the usage-rule type 204 of the license 200 decrypted by the license obtaining unit 101. In the case where the usage-rule type 204 is "the stateful usage rule", the processing advances to Step S603. In the case where the usage-rule type 204 is "the stateless usage rule", the processing advances to Step S606.

S603: the license accumulation control unit 102 encrypts the content key 206 of the license 200 by using the license management device unique key which is held by the unique information managing unit 107.

S604: the license accumulation control unit 102 records information regarding the license 200 on the license management information 300 which is managed by the license management information managing unit 109.

S605: the license accumulation control unit 102 calculates a hash value of the data in which the number of times of update 301 of the license management information 300 which has been recorded in Step S601 and the license management device unique key are combined with the license 200 whose content key 206 has been encrypted in Step S603. The license accumulation control unit 102 adds the hash value, as the tamper-resistant information 401, to the license 200.

S606: the license accumulation control unit 102 selects the domain key which is stored in combination with the domain ID 203 from among domain keys held by the domain information managing unit 108 and then encrypts the content key 206 of the license 200 by using the selected domain key.

S607: the license accumulation control unit 102 calculates a hash value of the data in which the domain key is combined with the license 200 whose content key 206 has been encrypted in Step S606. The license accumulation control unit 102 adds the hash value, as the tamper-resistant information 401, to the license 200.

S608: the license accumulation control unit 102 accumulates, in the license accumulation unit 110, the license 200 to which the tamper-resistant information 401 has been added.

The operations of the license accumulation processing according to the present embodiment have been described above.

Figure 7:
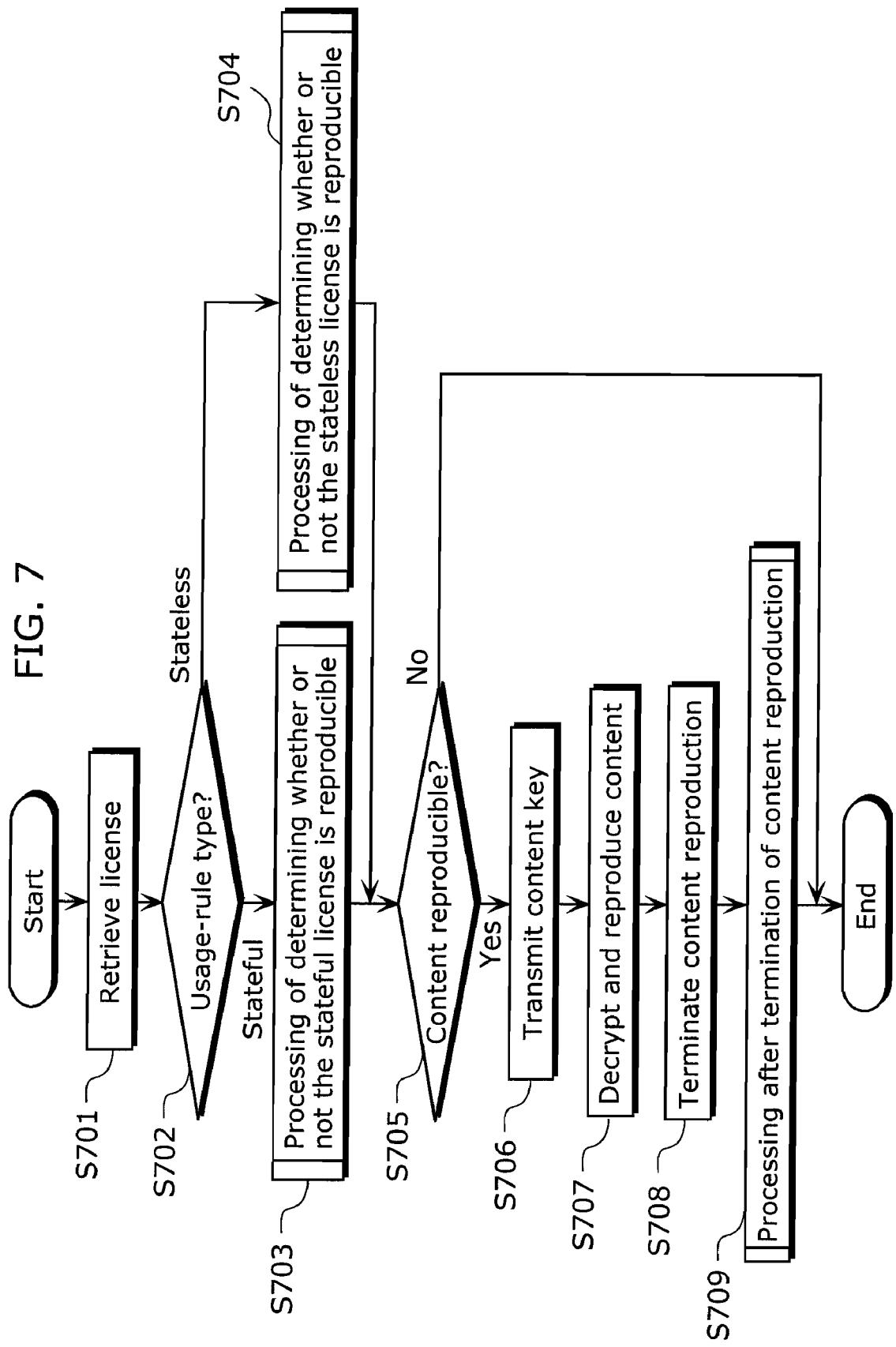
FIG. 7 is a flowchart illustrating operations of content reproduction processing.

FIG. 7 is a flowchart illustrating operations of the content reproducing processing performed by the content reproduction control unit 111 and the content decrypting/reproducing unit 112 shown in FIG. 1. Next, the operations of the content reproducing processing for reproducing content by using the license 200 in the license management device 100 of the present embodiment will be described with reference to the flowchart of FIG. 7.

S701: the content reproduction control unit 111 retrieves the license 200 to be used for reproduction of the content from the license accumulation unit 110.

S702: the content reproduction control unit 111 identifies the usage-rule type 204 of the license 200 retrieved in Step S701. In the case where the usage-rule type 204 is "the stateful usage rule", the processing advances to Step S703. In the case where the usage-rule type 204 is "the stateless usage rule", the processing advances to Step S704.

Figure 8:
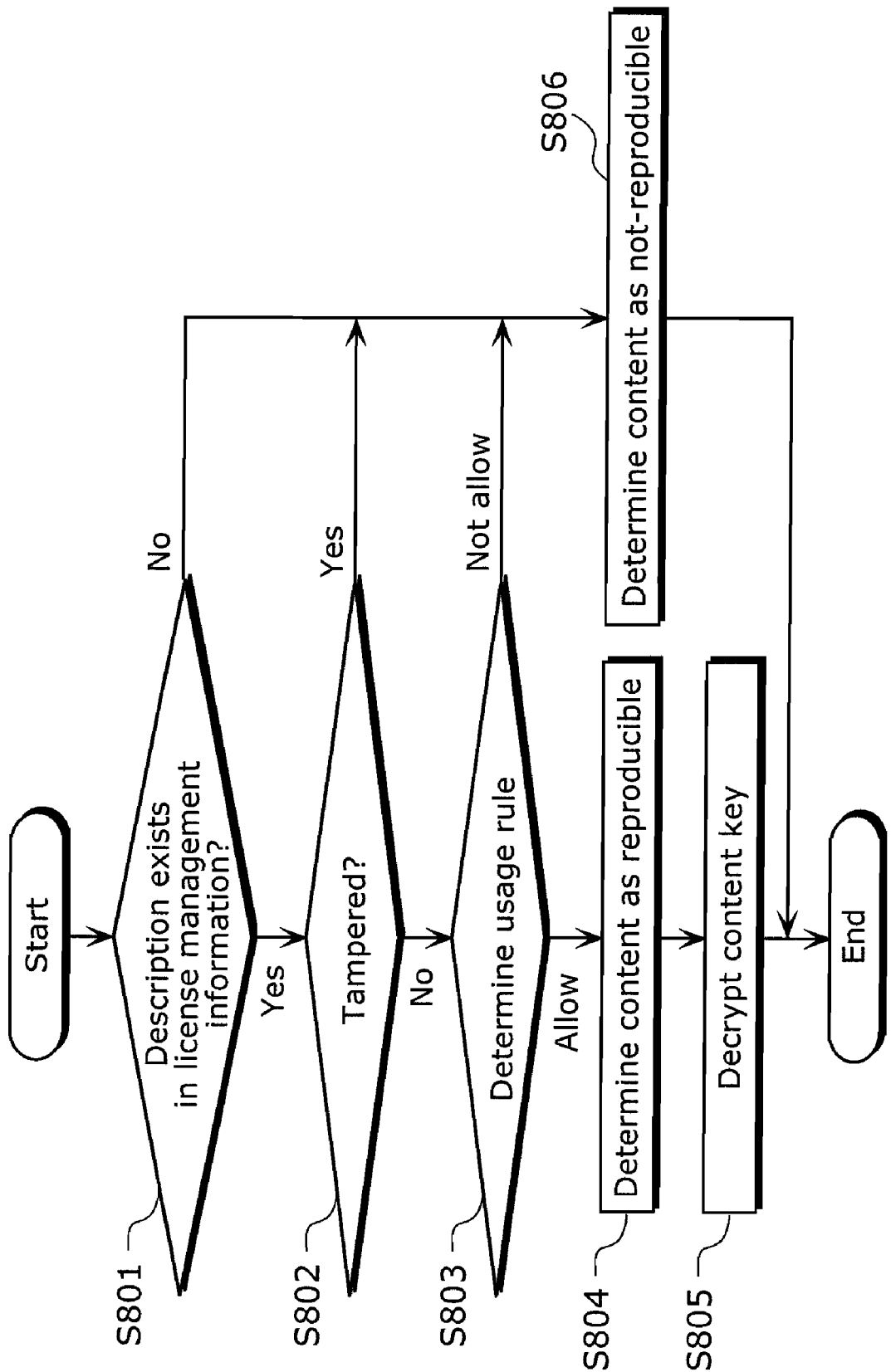
FIG. 8 is a flowchart illustrating operations of processing of determining whether or not the stateful license is reproducible.

S703: processing of determining whether or not the stateful license is reproducible, which will be described later with reference to FIG. 8, is performed to determine whether or not the content can be reproduced.

Figure 9:
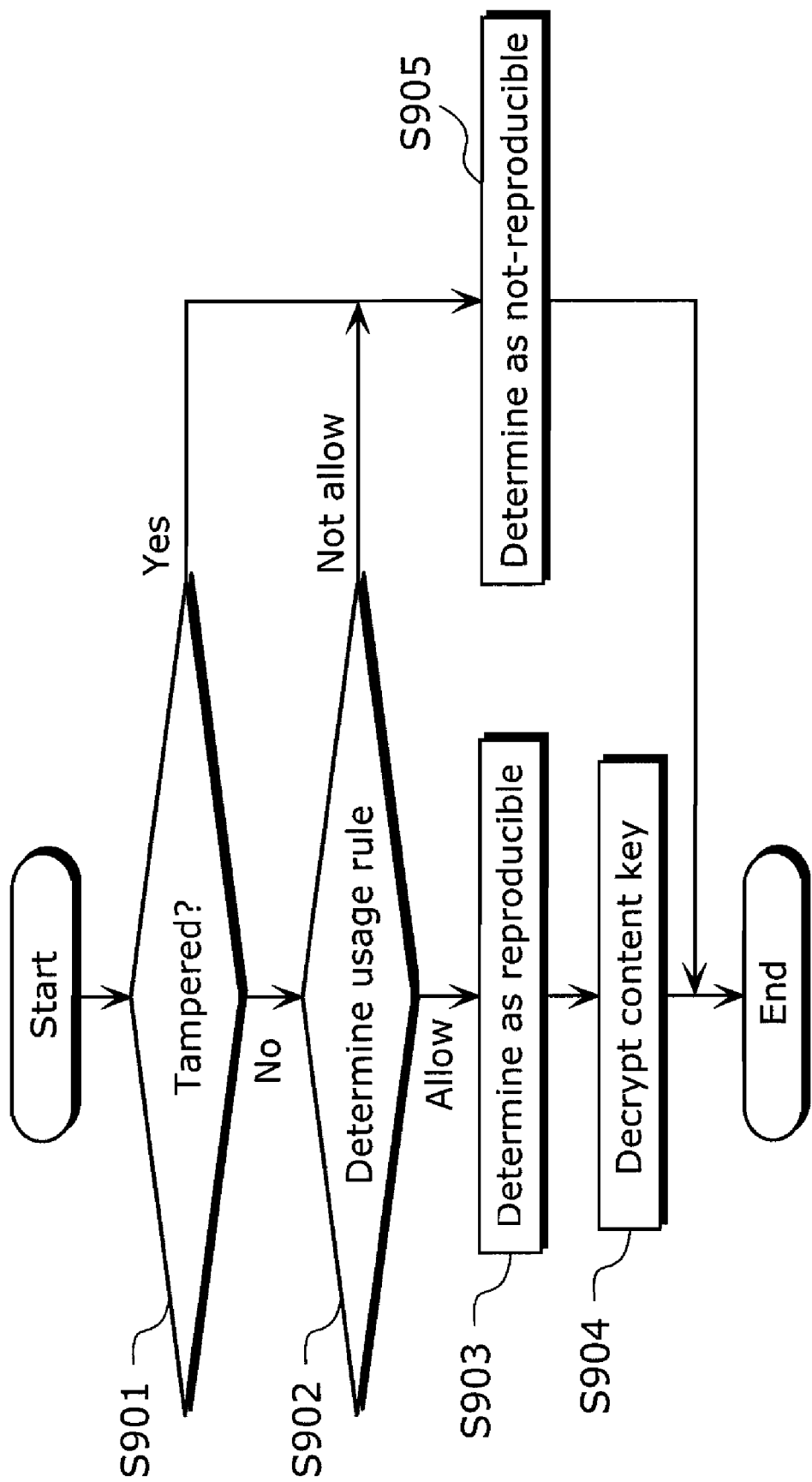
FIG. 9 is a flowchart illustrating operations of a processing of determining whether or not the stateless license is reproducible.

S704: processing of determining whether or not the stateless license is reproducible, which will be described later with reference to FIG. 9, is performed to determine whether or not the content can be reproduced.

S705: in the case where a result of determining whether or not the license is reproducible is "reproducible" in Step S703 or Step S704, the processing advances to Step S706. In the case where a result of determining whether or not the license is reproducible is "not reproducible" in Step S703 or Step S704, a notification informing that the content can not be reproduced is sent to the user via non-illustrated presentation units such as a display, and the process is terminated.

S706: the content reproduction control unit 111 transmits the content key 206 to the content decoding/reproducing unit 112. Note that it is preferable to protect the content key 206 during transmission between the content reproduction control unit 111 and the content decoding/reproducing unit 112 by using the SAC, and the like.

S707: the content decrypting/reproducing unit 112 decrypts the content accumulated in the content accumulation unit 113 by using the content key 206 received from the content reproduction control unit 111 and reproduces the content.

S708: the content decrypting/reproducing unit 112 terminates reproduction of the content in the case where the content has been reproduced through the end or an instruction to stop reproduction is sent from the user.

Figure 10:
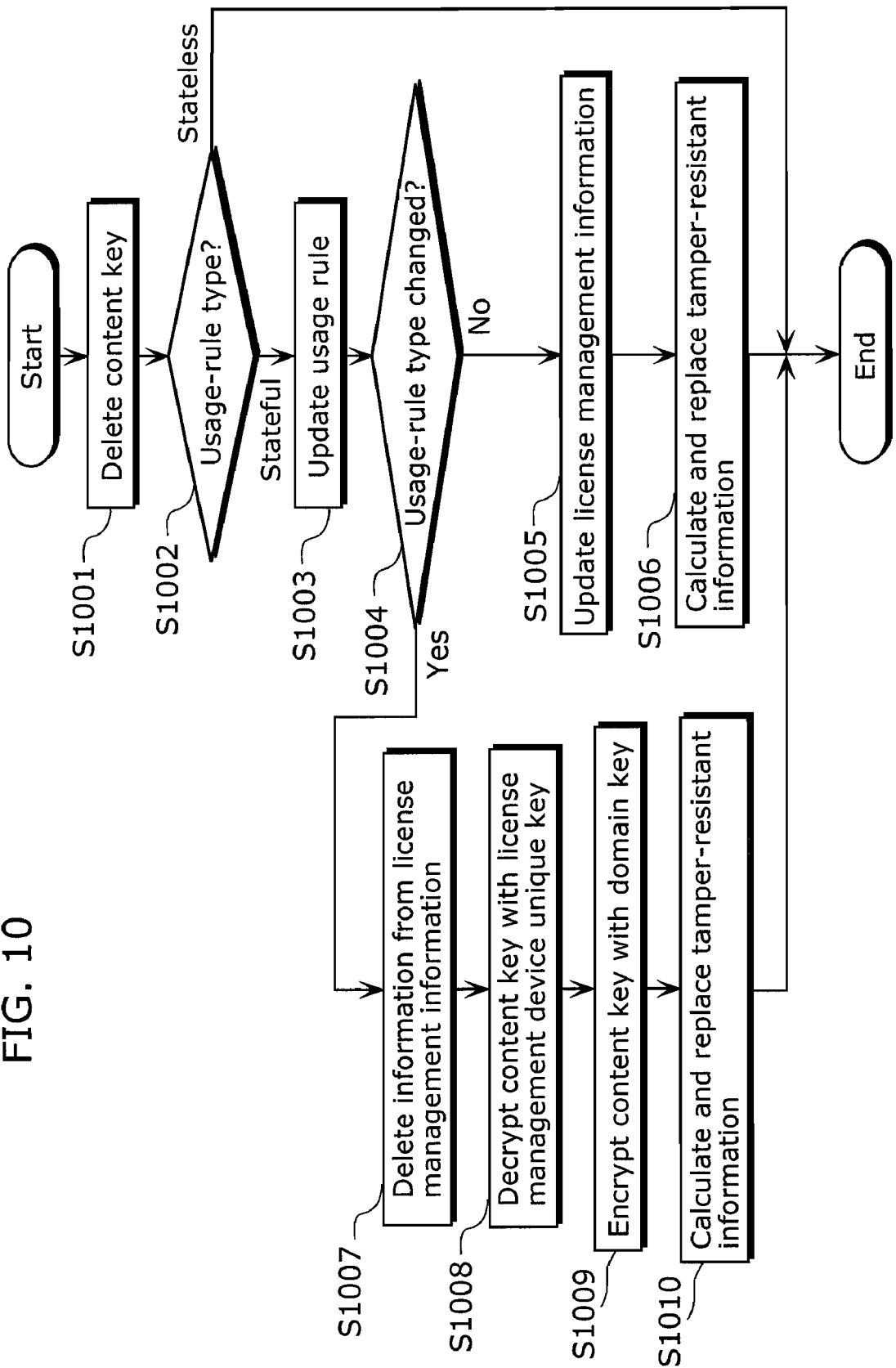
FIG. 10 is a flowchart illustrating operations of processing after termination of content reproduction.

S709: processing after termination of content reproduction, which will be described later with reference to FIG. 10, is performed.

The operations of the content reproduction processing according to the present embodiment have been described above.

FIG. 8 is a flowchart illustrating operations of processing of determining whether or not the stateful license is reproducible, the operation which is performed by the content reproduction control unit 111 as shown in FIG. 1. Next, operations of the processing of determining whether or not the stateful license is reproducible, which is shown in Step S703 of FIG. 7 will be described with reference to the flowchart of FIG. 8.

S801: the content reproduction control unit 111 refers to the license management information 300 which is managed by the license management information managing unit 109 and determines whether or not there is information regarding the license 200 to be used for reproducing the content. In the case where such information exists, the processing advances to Step S802. In the case where such information does not exist, the processing advances to Step S806.

S802: the content reproduction control unit 111 determines whether or not the license 200 has been tampered with. More specifically, the content reproduction control unit 111 calculates a hash value of the data in which the license 200, the number of times of update 301 of the license management information 300, and the license management device unique key are combined. The content reproduction control unit 111 compares the hash value with the tamper-resistant information 401 which is added to the license 200. The content reproduction control unit 111 determines that the license has not been tampered with in the case where the values agree according to the comparison result, and that the license has been tampered with in the case where the values do not agree according to the comparison result. In the case where the license has not been tampered with according to the determination, the processing advances to Step S803. In the case where the license has been tampered with according to the determination, the processing advances to Step S806.

S803: the content reproduction control unit 111 refers to the usage rule 205 of the license 200 to determine whether or not the content is allowed to be reproduced. In the case where the content is allowed to be reproduced, the processing advances to Step S804. In the case where the content is not allowed to be reproduced, the processing advances to Step S806.

S804: the content reproduction control unit 111 determines that the content is reproducible.

S805: the content reproduction control unit 111 retrieves the content key 206 from the license 200 and decrypts the content key 206 by using the license management device unique key which is held by the unique information managing unit 107.

S806: the content reproduction control unit 111 determines that the content is not reproducible.

The operations of the processing of determining whether or not the stateful license is reproducible have been described above.

FIG. 9 is a flowchart illustrating operations of processing of determining whether or not the stateless license is reproducible, the operation which is performed by the content reproduction control unit 111 as shown in FIG. 1. Next, operations of the processing of determining whether or not the stateless license is reproducible, which is shown in Step S703 of FIG. 7, will be described with reference to the flowchart of FIG. 9.

S901: the content reproduction control unit 111 determines whether or not the license 200 has been tampered with. More specifically, the content reproduction control unit 111 calculates a hash value of the data in which the license 200 and the domain key are combined. The content reproduction control unit 111 compares the hash value with the tamper-resistant information 401 which is added to the license 200. Note that the domain key which is stored in combination with the domain ID 203 of the license 200 is selected, from among domain keys held by the domain information managing unit 108, as the domain key to be connected. The content reproduction control unit 111 determines that the license has not been tampered with in the case where the values agree according to the comparison result, and that the license has been tampered with in the case where the values do not agree according to the comparison result. In the case where the license has not been tampered with, the processing advances to Step S902. In the case where the license has not been tampered with, the processing advances to Step S902.

S902: the content reproduction control unit 111 refers to the usage rule 205 of the license 200 and determines whether or not the content is allowed to be reproduced. In the case where the content is allowed to be reproduced, the processing advances to Step S903. In the case where the content is not allowed to be reproduced, the processing advances to Step S905.

S903: the content reproduction control unit 111 determines that the content is reproducible.

S904: the content reproduction control unit 111 retrieves the content key 206 from the license 200 and decrypts the content key 206 by using the domain key which is held by domain information managing unit 108. Note that the domain key which is stored in combination with the domain ID 203 of the license 200 is selected, from among domain keys held by the domain information managing unit 108, as the domain key to be used for decryption.

S905: the content reproduction control unit 111 determines that the content is not reproducible.

The operations of the processing of determining whether or not the stateless license is reproducible have been described above.

FIG. 10 is a flowchart illustrating operations of processing after termination of content reproduction performed by the content reproduction control unit 111 and the content decrypting/reproducing unit 112 shown in FIG. 1. Next, operations of the processing after termination of content reproduction, which is shown in Step S709 of FIG. 7, will be described with reference to the flowchart of FIG. 10.

S1001: the content decrypting/reproducing unit 112 deletes the content key 206 which is held by the content decrypting/reproducing unit 112, and notifies the content reproduction control unit 111 of termination of content reproduction.

S1002: the content reproduction control unit 111 identifies, when receiving the notification informing the termination of content reproduction, the usage-rule type 204 of the license 200 used for reproduction of the content. In the case where the usage-rule type 204 is "the stateful usage rule", the processing advances to Step S1003. In the case where the usage-rule type 204 is "the stateless usage rule", the processing is terminated.

S1003: the content reproduction control unit 111 updates the usage rule 205 of the license 200 in accordance with the content reproduction. In the case, for example, where the usage rule 205 indicates "five-time reproducible", this is updated to "four-time reproducible". For another example, in the case where the usage rule 205 indicates "available for a day after the first reproduction date" and the first reproduction has been carried out this time, a date one day after the current date is calculated and the usage rule 205 is updated to indicate that reproduction is allowed until that date.

S1004: the content reproduction control unit 111 refers to the usage rule 205 updated in Step S1003 and determines whether or not it has been changed to "stateless usage rule". In the case where it has been changed to "stateless usage rule", the content reproduction control unit 111 updates the usage-rule type 204 of the license 200 to "stateless usage rule" and the processing advances to Step S1007. In the case where it has not been changed to "stateless usage rule", the processing advances to Step S1005. An example of the case where the usage rule 205 is changed to "stateless usage rule" is the case where the usage rule 205 is updated from "valid for a day after the first reproduction date" to "reproducible until YYYY year MM month DD date".

S1005: the content reproduction control unit 111 updates the license management information 300 which is managed by the license management information managing unit 109. More specifically, one is added to the number of times of update 301 of the license management information 300.

S1006: the content reproduction control unit 111 calculates a hash value of the data in which the license 200, the number of times of update 301 which has been updated in Step S1005, and the license management device unique key. The content reproduction control unit 111 replaces the existing tamper-resistant information 401 with the calculated hash value as a new tamper-resistant information 401.

S1007: the content reproduction control unit 111 deletes information regarding the license 200 used for reproducing the content from the license management information 300 which is managed by the license management information managing unit 109.

S1008: the content reproduction control unit 111 decrypts the content key 206 of the license 200 by using the license management device unique key which is held by the unique information managing unit 107.

S1009: the content reproduction control unit 111 selects the domain key which is stored in combination with the domain ID 203 of the license 200 from among domain keys held by the domain information managing unit 108 and then encrypts the content key 206 of the license 200 by using the selected domain key.

S1010: the content reproduction control unit 111 calculates a hash value of the data in which the license 200 whose content key 206 has been encrypted in Step S1009 and the domain key are combined. The content reproduction control unit 111 replaces the existing tamper-resistant information 401 with the calculated hash value as a new tamper-resistant information 401.

The operations of processing after termination of content reproduction according to the present embodiment have been described above.

Figure 11:
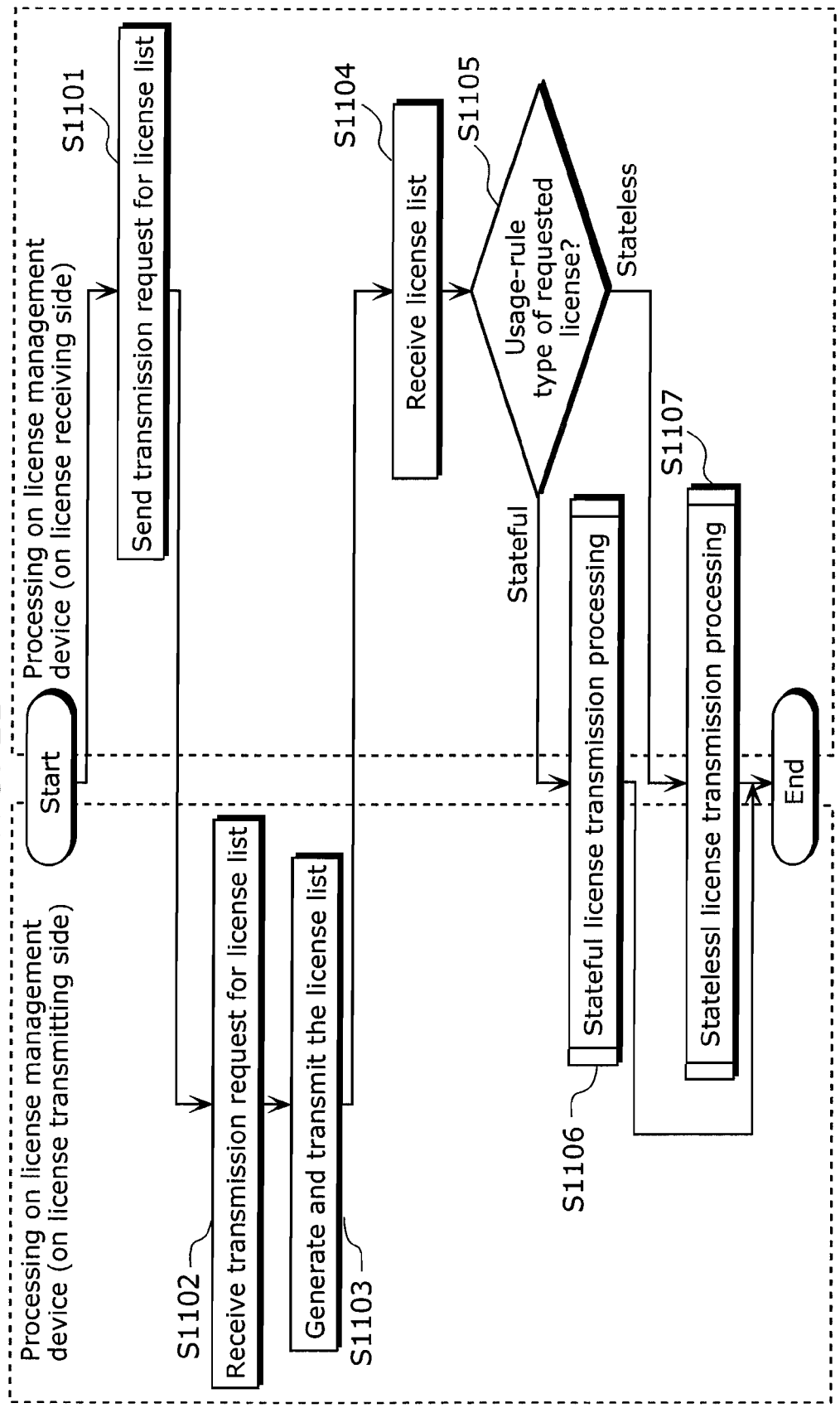
FIG. 11 is a flowchart illustrating operations of license transfer processing.

FIG. 11 is a flowchart illustrating operations of license transfer processing performed by the license transfer control unit 103 as shown in FIG. 1. Next, operations of license transfer processing for transferring the license 200 between the license management devices 100 will be described with reference to the flowchart of FIG. 11.

S1101: the license transfer control unit 103 in the license management device 100 on the side by which the license is received (hereinafter referred to as "license-receiving transfer control unit 103") sends a transmission request for the license list 500 to the license transfer control unit 103 in the license management device 100 on the side from which the license is transmitted (hereinafter referred to as "license-transmitting transfer control unit 103").

S1102: the license-transmitting transfer control unit 103 receives the transmission request for the license list 500.

S1103: the license-transmitting transfer control unit 103 generates the license list 500 and transmits the generated license list 500 to the license-receiving transfer control unit 103.

S1104: the license-receiving transfer control unit 103 receives the license list 500.

S1105: the license-receiving transfer control unit 103 refers to the license list 500 received in Step S1104 and identifies the usage-rule type 204 of the license 200 to be requested for transmission. In the case where the usage-rule type 204 of the license 200 to be requested for transmission is "stateful usage rule", the process advances to Step S1106. In the case where the usage-rule type 204 of the license 200 to be requested for transmission is "stateless usage rule", the process advances to Step S1107.

Figure 12:
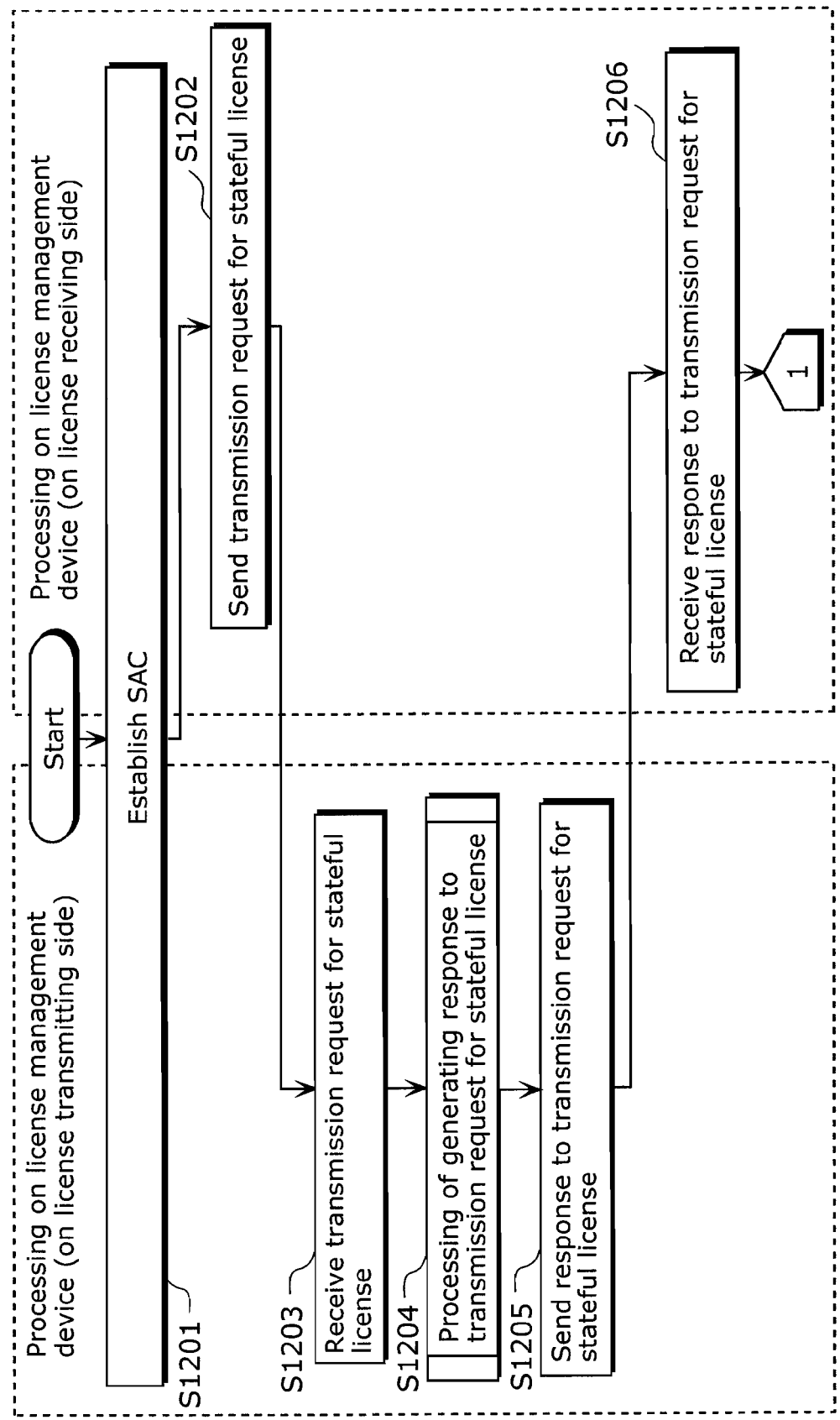
FIG. 12 is a flowchart illustrating operations of stateful license transfer processing.
Figure 13:
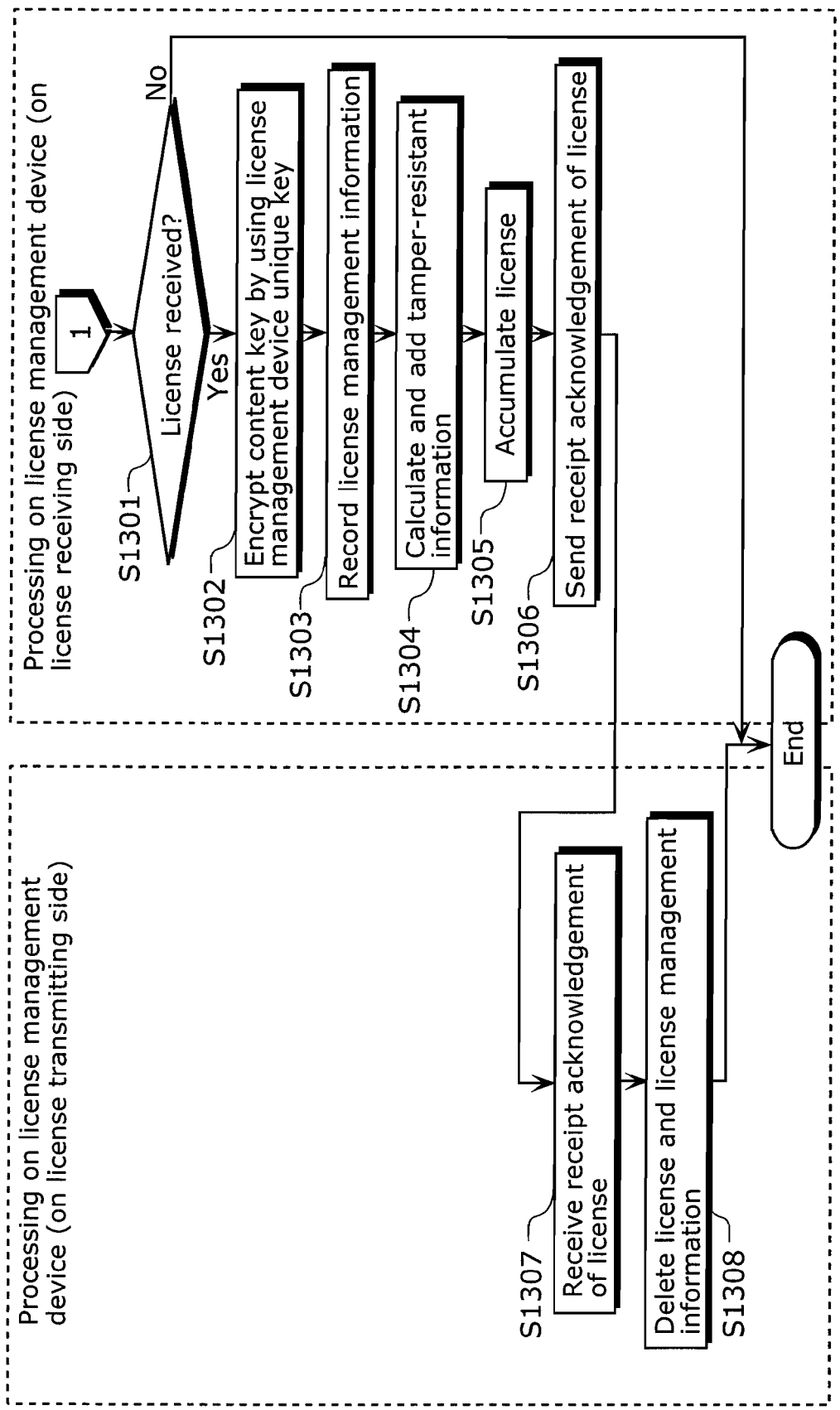
FIG. 13 is a flowchart illustrating operations of stateful license transfer processing.

S1106: a stateful license transfer processing that will be described later with reference to FIG. 12 and FIG. 13 is performed.

Figure 17:
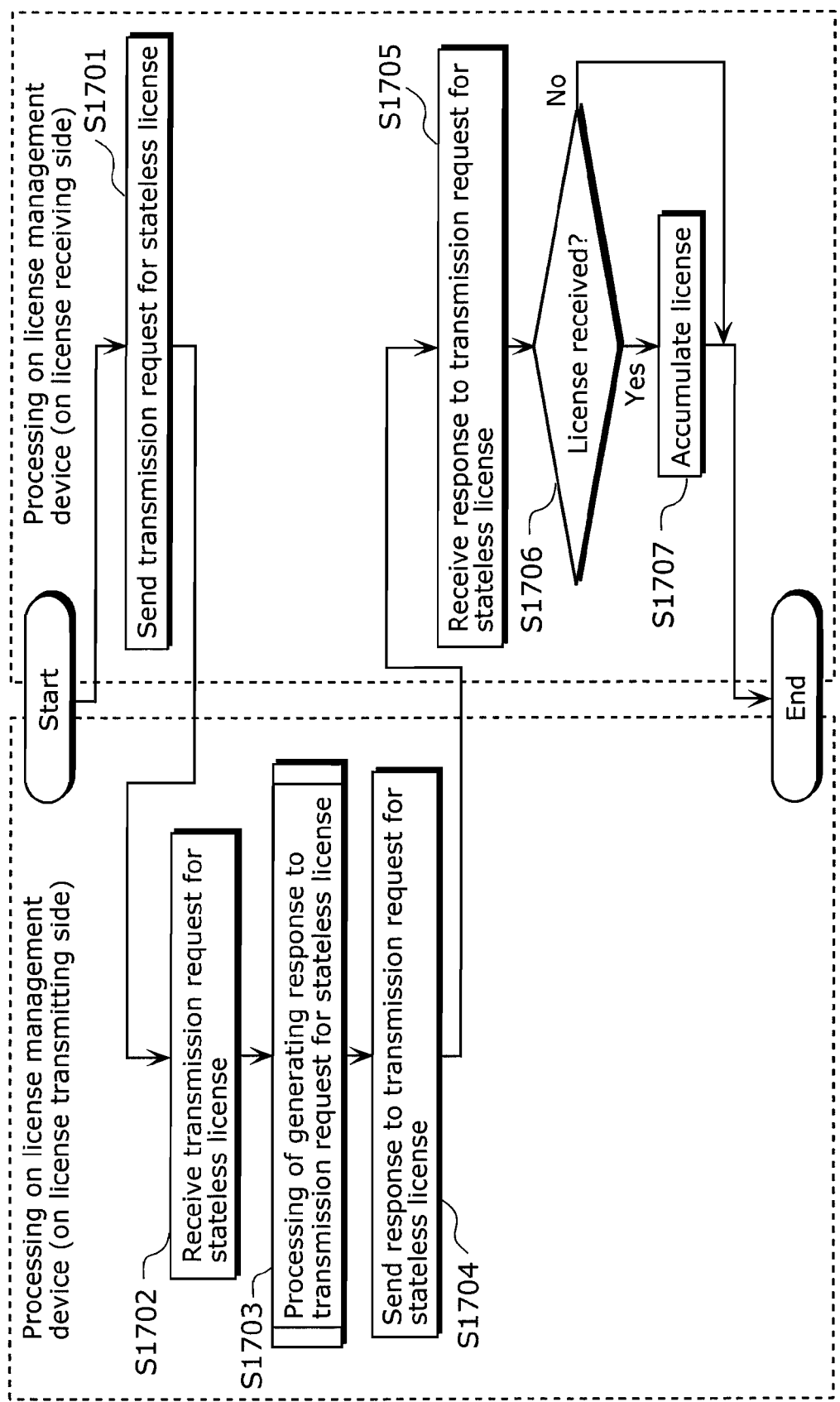
FIG. 17 is a flowchart illustrating operations of stateless license transfer processing.

S1107: a stateless license transfer processing that will be described later with reference to FIG. 17 is performed.

The operations of the license transfer processing according to the present embodiment have been described above.

Figure 14:
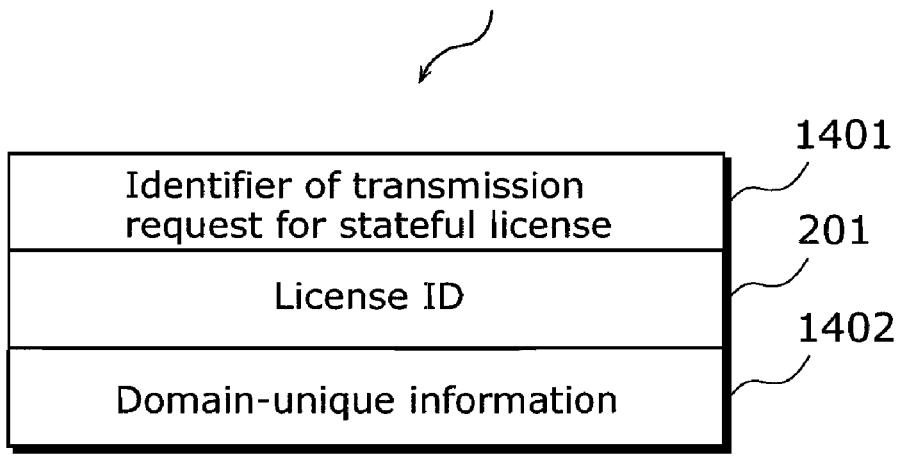
FIG. 14 is a diagram illustrating an example of a transmission request for a stateful license 1400.
Figure 15:
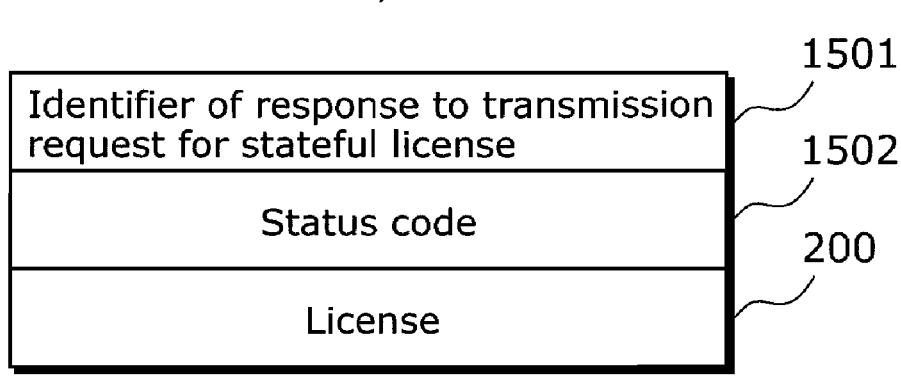
FIG. 15 is a diagram illustrating an example of a response to a transmission request for a stateful license 1500.

FIG. 12 and FIG. 13 are flowcharts illustrating operations of the stateful license transfer processing performed by the license transfer unit (transfer method A) 104 shown in FIG. 1. FIG. 14 is a diagram illustrating an example of a data structure of the transmission request for stateful license 1400. FIG. 15 is a diagram illustrating an example of a data structure of the response to transmission request for stateful license 1500. Next, the operations of the stateful license transfer processing in Step S1106 of FIG. 11 will be described with reference to the flowcharts in FIG. 12 and FIG. 13.

S1201: the license transfer unit (transfer method A) 104 in the license management device 100 on the side by which the license is received (hereinafter referred to as "license-receiving transfer unit (transfer method A) 104") mutually communicates with the license transfer unit (transfer method A) 104 in the license management device 100 on the side from which the license is transmitted (hereinafter referred to as "license-transmitting transfer unit (transfer method A) 104") to establish the SAC. All communications between the license-receiving transfer unit (transfer method A) 104 and the license-transmitting transfer unit (transfer method A) 104 are assumed to be carried out on the SAC on and following the present step. Note that conventional techniques are assumed to be used for the technique to establish the SAC.

S1201: the license-receiving transfer unit (transfer method A) 104 generates the transmission request for stateful license 1400 and send the request to the license-transmitting transfer unit (transfer method A) 104. The license-receiving transfer unit (transfer method A) 104, when generating the transmission request for stateful license 1400, writes information, on an identifier of transmission request for stateful license 1401, indicating that this data is the transmission request for stateful license 1400. The license-receiving transfer unit (transfer method A) 104 further writes a license ID 201 of the license 200 to be requested for transmission on the license ID 201. Note that, the domain key which is stored in combination with the domain ID 203 of the license 200 to be requested for transmission is selected from among domain keys held by the domain information managing unit 108 and the hash value of the selected domain key is written on the domain-unique information 1402.

S1203: the license-transmitting transfer unit (transfer method A) 104 receives the transmission request for stateful license 1400.

Figure 16:
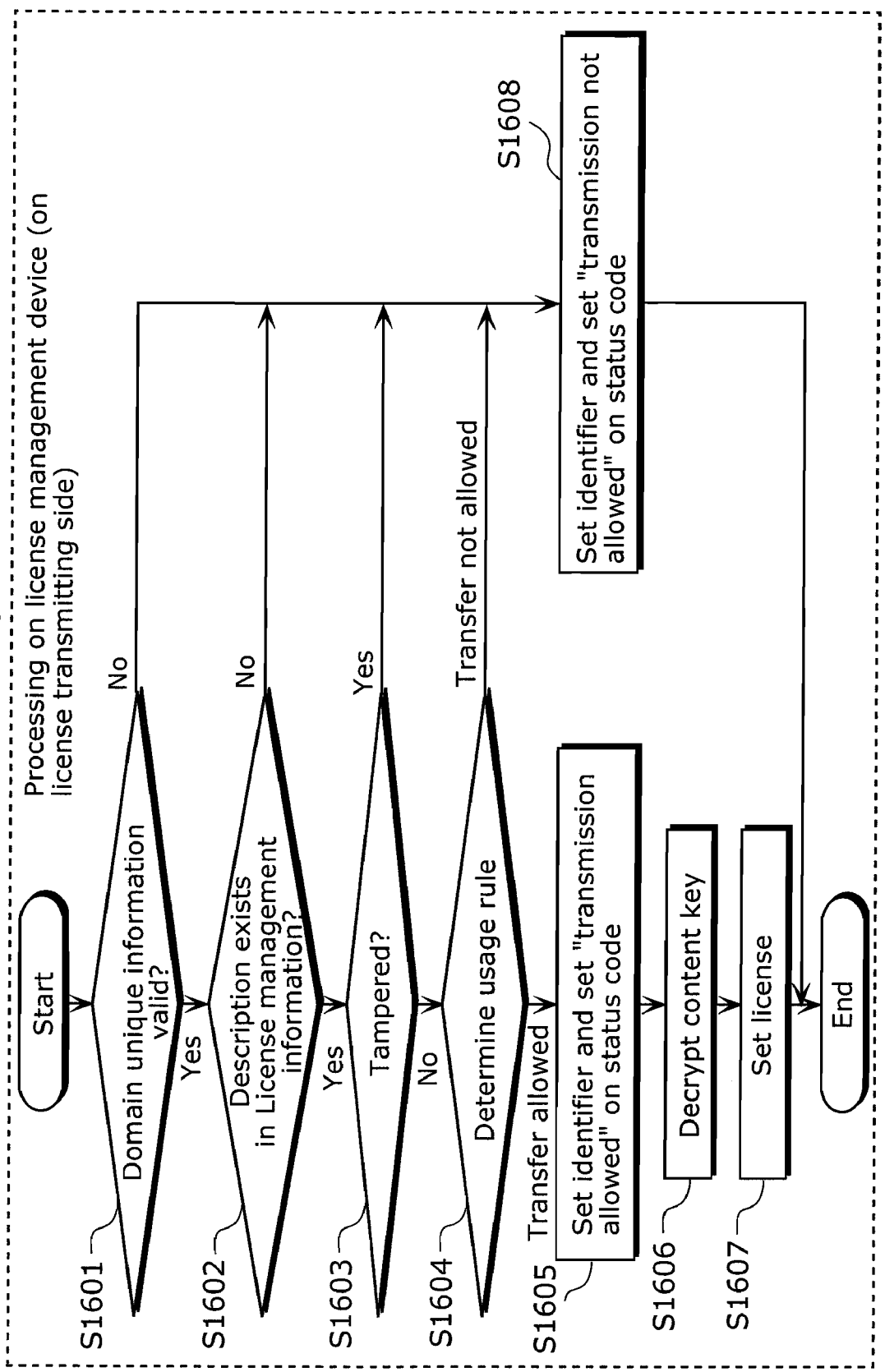
FIG. 16 is a flowchart illustrating operations of processing for generating a response to a transmission request for a stateful license.

S1204: processing of generating the response to transmission request for stateful license, which will be described later with reference to FIG. 16, is performed and a response to transmission request for stateful license 1500 (illustrated in FIG. 15) is generated. In FIG. 15, information indicating that this data is the response to transmission request for stateful license 1500 is written on the identifier of response to transmission request for stateful license 1501. Information indicating whether or not the license can be transmitted is written on a status code 1502. In the case where the license can be transmitted, the license 200 requested for transmission is written on the license 200.

S1205: the license-transmitting transfer unit (transfer method A) 104 sends the response to transmission request for stateful license 1500 generated in Step S1204 to the license-receiving transfer unit (transfer method A) 104.

S1206: the license-receiving transfer unit (transfer method A) 104 receives the response to transmission request for stateful license 1500.

On and following the next step, descriptions will be given with reference to FIG. 13.

S1301: the license-receiving transfer unit (transfer method A) 104 identifies the status code 1502 of the response to transmission request for stateful license 1500 received in Step S1206 and determines whether or not the license 200 requested for transmission has been received. In the case where the license 200 has been received, the process advances to Step S1302. In the case where the license 200 has not been received, the license-receiving transfer unit (transfer method A) 104 notifies the user, via non-illustrated presentation units, that the license 200 has not been received and terminates the processing.

S1302: the license-receiving transfer unit (transfer method A) 104 encrypts the content key 206 of the license 200 by using the license management device unique key which is held by the unique information managing unit 107.

S1303: the license-receiving transfer unit (transfer method A) 104 records, on the license management information 300 managed by the license management information managing unit 109, information regarding the license 200 which has been received.

S1304: the license-receiving transfer unit (transfer method A) 104 calculates a hash value of the data in which the license 200 whose content key 206 has been encrypted in Step S1302, the number of times of update 301 of the license management information 300 which has been recorded in Step S1303, and the license management device unique key are combined. The license-receiving transfer unit (transfer method A) 104 adds the hash value to the license 200 as the tamper-resistant information 401.

S1305: the license-receiving transfer unit (transfer method A) 104 accumulates, in the license accumulation unit 110, the license 200 to which the tamper-resistant information 401 has been added.

S1306: the license-receiving transfer unit (transfer method A) 104 sends a receipt acknowledgement of the license 200 to the license-transmitting transfer unit (transfer method A) 104.

S1307: the license-transmitting transfer unit (transfer method A) 104 receives the receipt acknowledgement of the license 200.

S1308: the license-transmitting transfer unit (transfer method A) 104 deletes: the transmitted license 200 from the license accumulation unit 110; and the information regarding the license 200 from the license management information 300 managed by the license management information managing unit 109.

The operations of the stateful license transfer processing according to the present embodiment have been described above.

FIG. 16 is a flowchart illustrating operations of processing of generating a response to transmission request for stateful license, which is performed by the license transfer unit (transfer method A) 104 shown in FIG. 1. Next, the operations of the processing of generating a response to transmission request for stateful license in Step S1204 of FIG. 12 will be described with reference to the flowchart in FIG. 16.

S1601: the license-transmitting transfer unit (transfer method A) 104 determines whether or not the domain-unique information 1402 which is included in the transmission request for stateful license 1400 received in Step S1203 is valid. More specifically, the license-transmitting transfer unit (transfer method A) 104 selects, from among domain keys held by the domain information managing unit 108, the domain key which is stored in combination with the domain ID 203 of the license 200 which is requested for transmission and calculates a hash value of the selected domain key. Then, the calculated hash value is compared to the value written on the domain-unique information 1402 which is included in the transmission request for stateful license 1400. In the case where the values agree, the domain-unique information 1402 is determined as "valid". In the case where the values do not agree, the domain-unique information 1402 is determined as "invalid". In the case where the domain-unique information 1402 is valid, the processing advances to Step S1602. In the case where the domain-unique information 1402 is not valid, the processing advances to Step S1608.

S1602: the license-transmitting transfer unit (transfer method A) 104 refers to the license management information 300 managed by the license management information managing unit 109 and determines whether or not the information regarding the license 200 which is requested for transmission has been written. In the case where such a information exists, the process advances to Step S1603. In the case where such information does not exist, the process advances to Step S1608.

S1603: the license-transmitting transfer unit (transfer method A) 104 determines whether or not the license 200 which is requested for transmission has been tampered. More specifically, the license-transmitting transfer unit (transfer method A) 104 calculates a hash value of the data in which the license 200, the number of times of update 301 of the license management information 300, and the license management device unique key are combined. The license-transmitting transfer unit (transfer method A) 104 compares the hash value with the tamper-resistant information 401 which is added to the license 200. The content reproduction control unit 111 determines that the license has not been tampered with in the case where the values agree according to the comparison result, and that the license has been tampered with in the case where the values do not agree according to the comparison result. In the case where the license has not been tampered with according to the determination, the process advances to Step S1604. In the case where the license has been tampered with, the process advances to Step S1608.

S1604: the license-transmitting transfer unit (transfer method A) 104 refers to the usage rule 205 of the license 200 to determine whether or not the license 200 is allowed to be transferred. In the case where transfer is allowed, the process advances to Step S1605. In the case where transfer is not allowed, the process advances to Step S1608.

S1605: the license-transmitting transfer unit (transfer method A) 104 writes: information indicating that this data is the response to transmission request for stateful license 1500 on the identifier of response to transmission request for stateful license 1501 of the response to transmission request for stateful license 1500; and "license transmission allowed" on the status code 1502.

S1606: the license-transmitting transfer unit (transfer method A) 104 decrypts the content key 206 by using the license management device unique key which is held by the unique information managing unit 107.

S1607: the license-transmitting transfer unit (transfer method A) 104 writes, on the license 200 of the response to transmission request for stateful license 1500, the license 200 whose content key 206 has been decrypted in Step S1606.

S1608: the license-transmitting transfer unit (transfer method A) 104 writes: information indicating that this data is the response to transmission request for stateful license 1500 on the identifier of response to transmission request for stateful license 1501 of the response to transmission request for stateful license 1500; and "license transmission not allowed" on the status code 1502.

The operations of the processing of generating a response to transmission request for stateful license according to the present embodiment have been described above.

Figure 18:
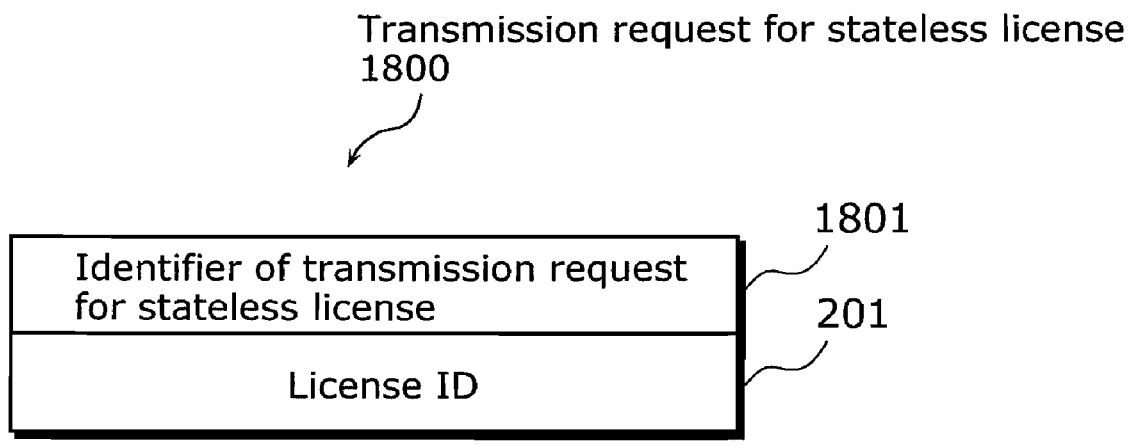
FIG. 18 is a diagram illustrating an example of a transmission request for a stateless license 1800.
Figure 19:
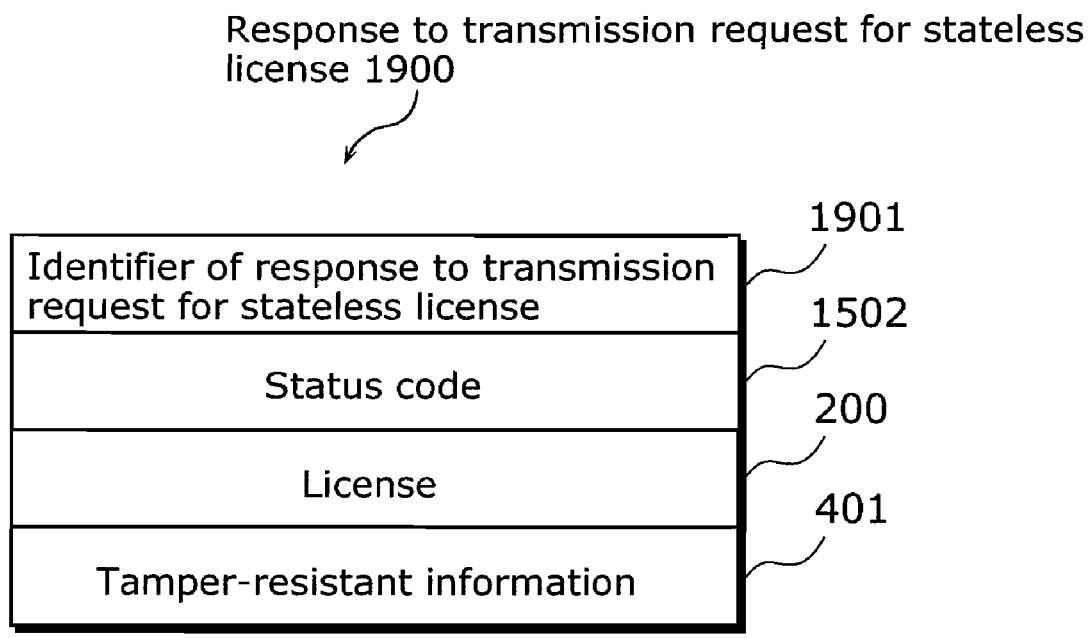
FIG. 19 is a diagram illustrating an example of a response to a transmission request for a stateless license 1900.

FIG. 17 is a flowchart illustrating operations of the stateless license transfer processing performed by the license transfer unit (transfer method B) 105 illustrated in FIG. 1. FIG. 18 is a diagram illustrating an example of a data structure of a transmission request for stateless license 1800. FIG. 19 is a diagram illustrating an example of a data structure of a response to transmission request for stateless license. Next, the operations of the stateless license transfer processing in Step S1107 of FIG. 11 will be described with reference to the flowchart of FIG. 17.

S1701: the license transfer unit (transfer method B) 105 in the license management device 100 on the side by which the license is received (hereinafter referred to as "license-receiving transfer unit (transfer method B) 105") generates the transmission request for stateless license 1800 as illustrated in FIG. 18 and sends the request 1800 to the license transfer unit (transfer method B) 105 in the license management device 100 on the side from which the license is transmitted (hereinafter referred to as "license-transmitting transfer unit (transfer method B) 105"). The license-receiving transfer unit (transfer method B) 105, when generating the transmission request for stateless license 1800, writes: information indicating that this data is the transmission request for stateless license 1800 on an identifier of transmission request for stateless license 1801; and the license ID 201 of the license of which transmission is requested on the license ID 201.

S1702: the license-transmitting transfer unit (transfer method B) 105 receives the transmission request for stateless license 1800.

Figure 20:
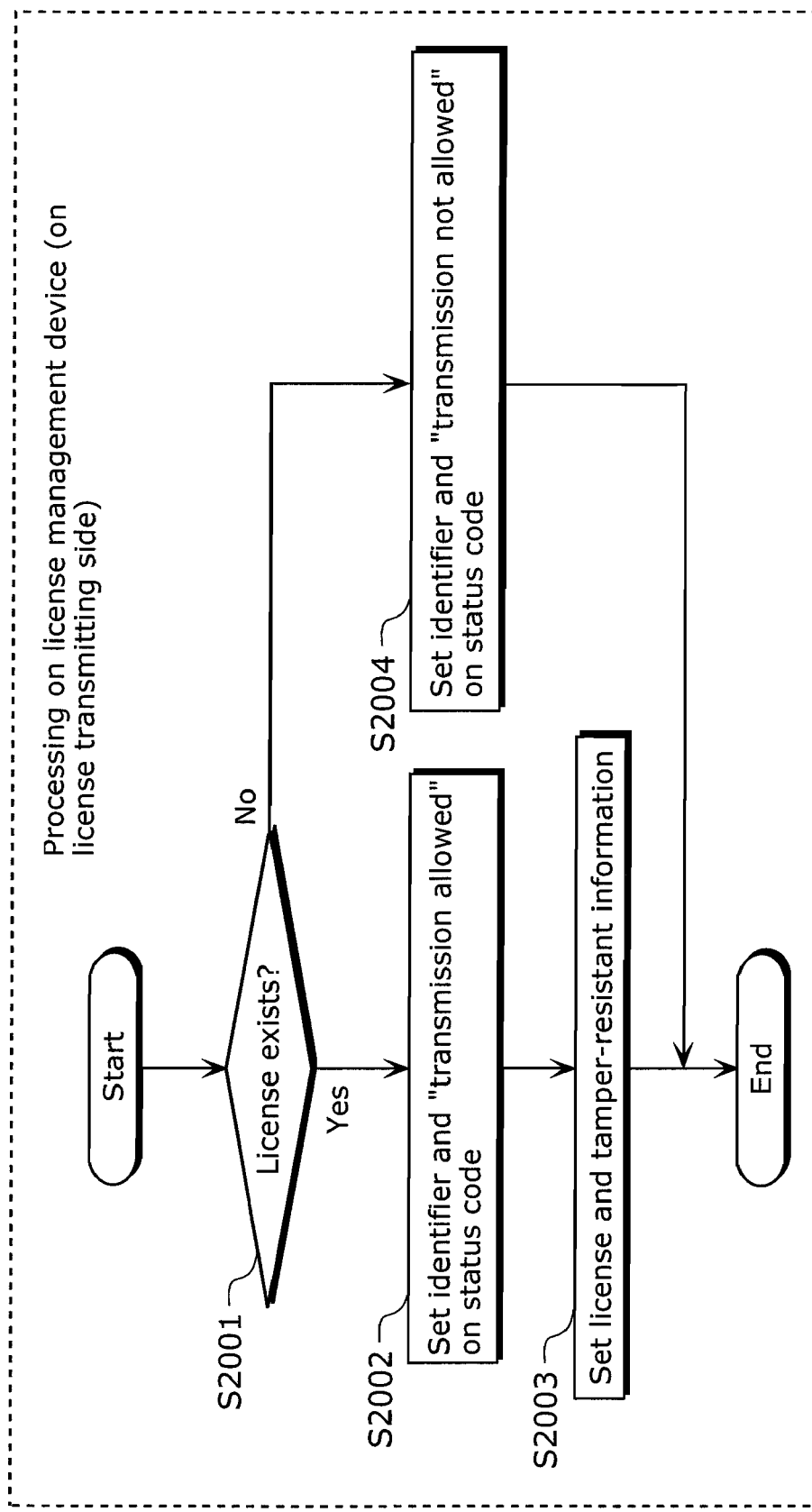
FIG. 20 is a flowchart illustrating operations of processing for generating a response to a transmission request for a stateless license.

S1703: processing of generating the response to transmission request for stateless license, which will be described later with reference to FIG. 20, is performed and a response to transmission request for stateless license 1900 (illustrated in FIG. 19) is generated. In FIG. 19, information indicating that this data is the response to transmission request for stateless license 1900 is written on the identifier of response to transmission request for stateless license 1901. Information indicating whether or not the license can be transmitted is written on the status code 1502. The license 200 of which transmission is requested is written on the license 200. The tamper-resistant information 401 added to the license 200 of which transmission is requested is written on the tamper-resistant information 401.

S1704: the license-transmitting transfer unit (transfer method B) 105 sends the response to transmission request for stateless license 1900 generated in Step S1703 to the license-receiving transfer unit (transfer method B) 105.

S1705: the license-receiving transfer unit (transfer method B) 105 receives the response to transmission request for stateless license 1900.

S1706: the license-receiving transfer unit (transfer method B) 105 identifies the status code 1502 of the response to transmission request for stateless license 1900 which has been received in Step S1705 and determines whether or not the license 200 of which transmission is requested has been received. In the case where the license 200 has been received, the process advances to Step S1707. In the case where the license 200 has not been received, the license-receiving transfer unit (transfer method B) 105 notifies the user that the license 200 has not been received via non-illustrated presentation units, such as a display, and terminates the processing.

S1707: the license 200 included in the response to transmission request for stateless license 1900 which has been received in Step S1705 and the tamper-resistant information 401 are combined and accumulated in the license accumulation unit 110 by the license-receiving transfer unit (transfer method B) 105.

The operations of the stateless license transfer processing according to the present embodiment have been described above.

FIG. 20 is a flowchart illustrating operations of processing for generating a response to transmission request for stateless license performed by the license transfer unit (transfer method B) 105 as illustrated in FIG. 1. Next, the operations of the processing for generating the response to transmission request for stateless license in Step S1703 of FIG. 17 will be described with reference to the flowchart of FIG. 20.

S2001: the license-transmitting transfer unit (transfer method B) 105 determines whether or not the license 200 of which transmission is requested has been accumulated in the license accumulation unit 110. In the case where it is determined that the license 200 has been accumulated, the processing advances to Step S2002 In the case where the license 200 has not been accumulated, the processing advances to Step S2004

S2002: the license-transmitting transfer unit (transfer method B) 105 writes: information indicating that this data is the response to transmission request for stateless license 1900 on the identifier of response to transmission request for stateless license 1901 of the response to transmission request for stateless license 1900; and "license transmission allowed" on the status code 1502.

S2003: the license-transmitting transfer unit (transfer method B) 105 writes, on the license 200 of the response to transmission request for stateless license 1900, the license 200 of which is transmission is requested and whose content key has been encrypted by the domain key. Further, the license-transmitting transfer unit (transfer method B) 105 writes, on the tamper-resistant information 401 of the response to transmission request for stateless license 1900, the tamper-resistant information 401 added to the license 200.

S2004: the license-transmitting transfer unit (transfer method B) 105 writes: information indicating that this data is the response to transmission request for stateless license 1900 on the identifier of response to transmission request for stateless license 1901 of the response to transmission request for stateless license 1900; and "license transmission not allowed" on the status code 1502.

The operations of the processing for generating a response to a transmission request for a stateless license according to the present embodiment have been described above.

The operations of the license management device 100 according to the present embodiment have been described above.

Note that it is desirable to make at least the following units tamper-resistant before mounting: the license obtaining unit 101; the license accumulation control unit 102; the license transfer unit (transfer method A) 104; the unique information managing unit 107; the domain information managing unit 108; the license management information managing unit 109;

the content reproduction control unit 111; and the content decrypting/reproducing unit 112.

Further, although it has been described in the present embodiment that structural elements of the license management device 100 are mounted in a single package, the present invention is not limited to this but the structural elements may be mounted separately in, for example, plural packages, or a package and an IC card, and the like. The following configuration, for example, is conceivable: the license obtaining unit 101, the license accumulation control unit 102, the license transfer unit (transfer method A) 104, the unique information managing unit 107, the domain information managing unit 108 and the content reproduction control unit 111 are mounted in an IC card and other units are mounted in a Set Top Box (STB).

Although it has been described in the present embodiment that only the content key 206 is encrypted when accumulating the license 200 in the license accumulation unit 110, the present invention is not limited to this embodiment but a part of the license 200 including the content key 206 or the entire license 200 may be encrypted.

Although it has been explained in the present embodiment that, when calculating the tamper-resistant information 401, the license management device unique key or the domain key is combined with the license 200 so as to be the data of which a hash value is calculated, the present invention is not limited to this embodiment but the license management device ID instead of the license management device unique key, or the domain ID 203 instead of the domain key with the license 200 may be combined with the license 200.

Although it has been explained in the present embodiment that, when calculating the tamper-resistant information 401, the data of which a hash value is calculated is obtained by combining various data with the data of the license 200 whose content key 206 has been encrypted, the present invention is not limited to this embodiment but the data of which a hash value is calculated may be obtained by combining the various data with the data of the license 200 before encrypting the content key 206.

Although it has been explained in the present embodiment that the license 200 includes the domain ID 203, the present invention is not limited to this embodiment but the license 200 may include other information capable of identifying the domain ID 203.

Although it has been explained in the present embodiment that the license 200 includes the usage-rule type 204 and what processing to be performed is determined based on the usage-rule type 204, the present invention is not limited to this embodiment but what processing to be performed may be determined, without inclusion of the usage-rule type 204 into the license 200, based on the information of the usage-rule type which has been obtained by referring to what is written in the usage rule 205.

Although it has been explained, in the processing after termination of content reproduction of FIG. 10, that the content decrypting/reproducing unit 112 notify the content reproduction control unit 111 of termination of content reproduction without fail (the processing in Step S1001), the present invention is not limited to this embodiment but termination of content reproduction does not have to be notified in the case where the usage-rule type 204 of the license 200 used for content reproduction is "the stateless usage rule". In this case, when the content reproduction control unit 111 transmits the content key 206 to the content decrypting/reproducing unit 112 in the content reproduction processing of FIG. 7 (the processing in Step S706), the usage-rule type 204 is concurrently transmitted, and the content decrypting/reproducing unit 112 determines, based on this information, whether or not the termination of content reproduction has to be notified.

Although it has been described in the present embodiment that the license list 500 includes the usage-rule type 204, the present invention is not limited to this embodiment but the usage rule 205 may be included instead of the usage-rule type 204. In this case, the type of the usage rule is obtained by referring to what is written in the usage rule 205.

Although it has been explained, in the stateful license transfer processing of FIG. 12 and FIG. 13, that the hash value of the domain key is included in the transmission request for stateful license 1400 as the domain-unique information 1402 and transmitted (the processing in Step S1202), the present invention is not limited to this embodiment but it may be any information as long as it is the information unique to the domain and can be generated only by the license management device 100 which belongs to the domain. Further, the domain-unique information 1402 may be transmitted by using any method as long as the method can prevent tampering and masquerading. For example, it is conceivable that the domain-unique information 1402 is transmitted in the processing of establishing the SAC (the processing in Step S1201), and the SAC establishment is disabled when the domain ID 203 does not agree.

Although it has been explained in the present embodiment that the processing to be carried out is switched according to the usage-rule type 204 of the license 200, information designating switching of the processing may be provided in the license 200, and the processing may be switched according to the information. For example, it is conceivable that the information is designated according to: whether or not the license can be transferred; details of the content; a price of the content; and the like, and the processing is switched according to the information Although it has been explained, in the content reproducing processing of FIG. 7, that updating the usage rule 205 of the license 200 used for reproducing the content and processings accompanied by the update (the processings S1003 to S1010 of FIG. 10) are performed after termination of content reproduction, the present invention is not limited to this embodiment but they may be performed before starting content reproduction (following Step S804 or Step S805 of FIG. 8).

Although it has been explained, in the stateless license transfer processing of FIG. 17, that the license-receiving transfer unit (transfer method B) 105 accumulates the received license 200 and the tamper-resistant information 401 in the license accumulation unit 110 without determining whether or not there has been tampering (the processing in Step S1707), the license-receiving transfer unit (transfer method B) 105 may determine, prior to the accumulation, whether or not there has been tampering.

Although it has been explained in the license accumulation processing of FIG. 6 that, when accumulating the license 200 whose usage-rule type 204 is "stateful", information regarding the license 200 is recorded on the license management information 300 (the processing in Step S604), the processings in Step 603 to S605 may be performed before using the license (prior to Step S701) without performing them when receiving the license 200, for the purpose of size reduction of the license management information 300. In the case where the processings in Step 603 to S605 are not performed when receiving the license 200, the tamper-resistant information 401 to be added when the license 200 is accumulated is calculated as a hash value of the license 200. Further, the tamper-resistant information 401 is added to the license 200 and then encrypted together by using the license management device unique key.

The license management device 100 according to the present embodiment has been described above.

Although the above-described embodiment has been explained on the assumption that the license can be transferred, the present invention is not limited to embodiment but can be applied even when the usage rule designates whether or not the license is transferable.

Figure 21:
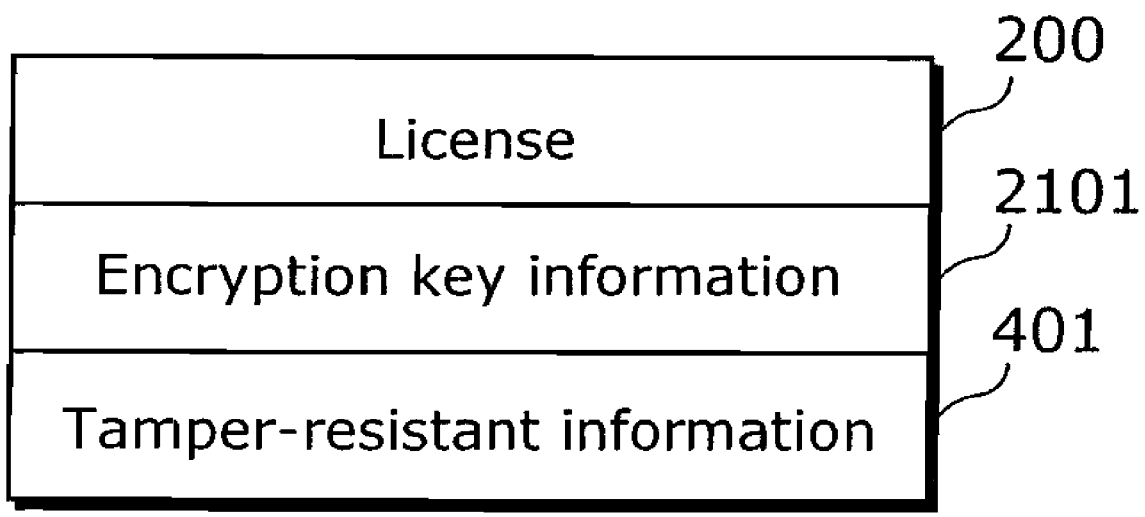
FIG. 21 is a diagram illustrating a data structure of an accumulated license in the case where a usage rule designates whether or not the license is transferable.

In this case, whether or not the license 200 is transferable is written on the usage rule 205 as illustrated in FIG. 2. In the case where the usage rule 205 designates that the license 200 is not transferable, the license management device 100 encrypts the license 200 with the license management device unique key and then stores it in the license accumulation unit 110, even when the license 200 has the usage-rule type 204 of "the stateless usage rule". In this case, whether the license 200 has been encrypted with the license management device unique key or the domain key can not be determined only by finding whether the usage-rule type 204 is "the stateless usage rule" or "the stateful usage rule". FIG. 21 illustrates a data structure of the license 200 when accumulated in the case where the usage rule designates whether or not the license 200 is transferable. For that reason described above, encryption key information 2101 and the tamper-resistant information 401 are added to the license 200, as illustrated in FIG. 21, when the license 200 is accumulated in the license accumulation unit 110. The encryption key information 2101 is information indicating which of the license management device unique key or the domain key has encrypted the license 200. The tamper-resistant information 401 is the same as the one in the above-described embodiment, in the case where the license 200 has the usage-rule type 204 of "stateful usage rule" or in the case where the license 200 which is designated as "transferable" by the usage rule 205 has the usage-rule type 204 of "stateless usage rule".

The tamper-resistant information 401 is calculated in a different manner from the above-described embodiment in the case where the license 200 is designated as "not transferable" in the usage rule 205 and has the usage-rule type 204 of the "stateless usage rule". In this case, the license 200 is encrypted with the license management device unique key. However, since the usage-rule type 240 is not "stateful usage rule", the usage rule 205 is not updated even when the content is used. Thus, the license management information 300 is not generated in this license 200. Accordingly, the license accumulation control unit 102 calculates a hash value of the data in which the license management device unique key is combined with the license 200, as the tamper-resistant information 401.

Figure 22:
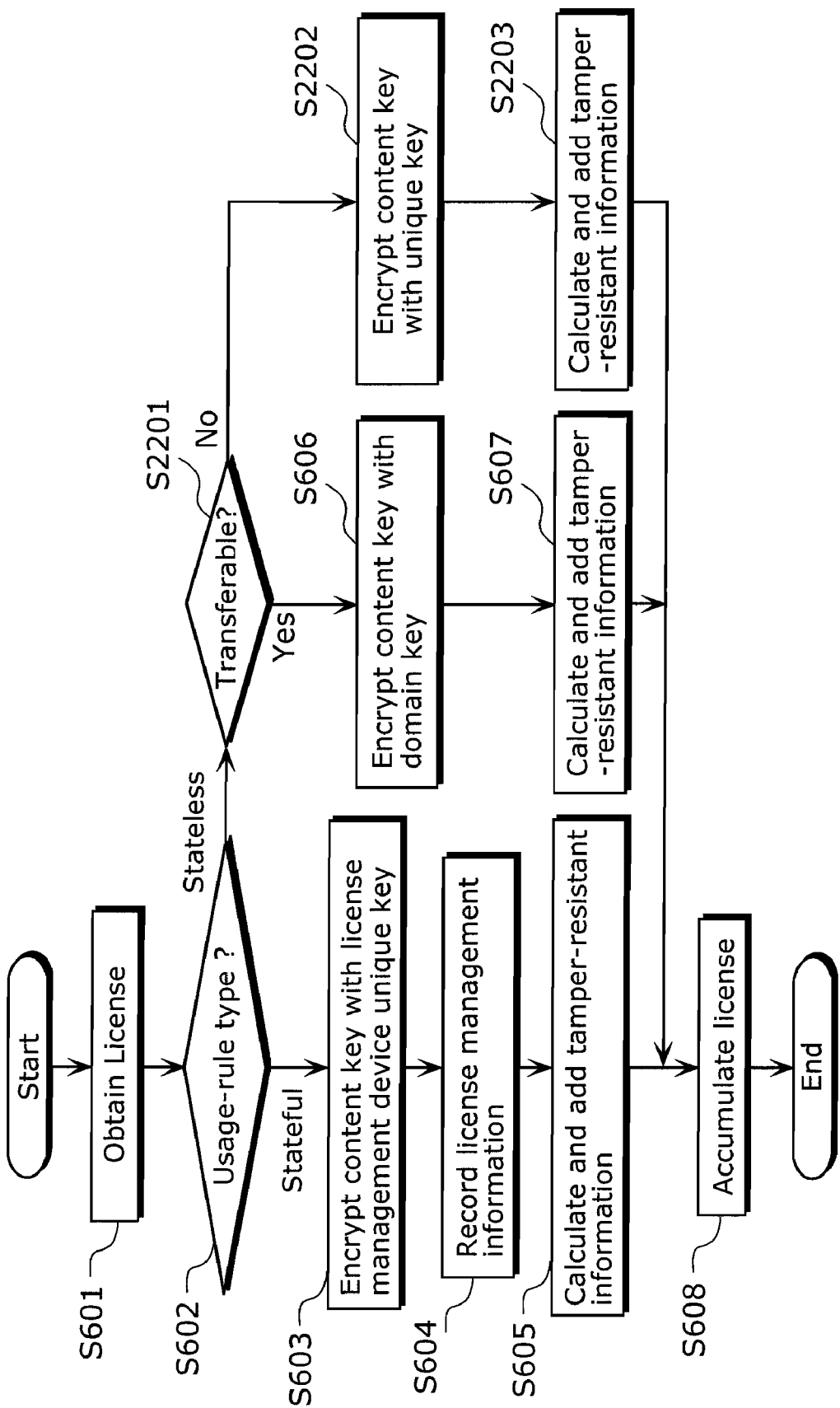
FIG. 22 is a flowchart illustrating operations of the license management device of license accumulation processing in the case where a usage rule designates whether or not the license is transferable.

FIG. 22 is a flowchart illustrating operations of the license management device 100 in a license accumulation processing in the case where the usage rule designates whether or not the license can be transferred. The operations of the license management device 100 in the license accumulation processing is the same as the one in the above-described embodiment as illustrated in FIG. 6, in the case where the license 200 has the usage-rule type 204 of "stateful usage rule". Accordingly, in the case where the license accumulation control unit 102 identifies the usage-rule type 204 as "the stateless usage rule" in Step 602 of FIG. 6, the following processings in FIG. 22 (S2201, S2202, and S2203) are different from the ones of FIG. 6.

More specifically, the license accumulation control unit 102 advances the processing to Step S2201 in the case where the usage-rule type 204 is "stateless usage rule" in Step S602.

S2201: the license accumulation control unit 102 identifies the usage rule 205 of the license 200. In the case where the usage rule 205 is "transferable", the processing advances to Step S606. In the case where the usage rule 205 is "not transferable", the process advances to Step S2202.

S2202: the license accumulation control unit 102 encrypts the content key 206 of the license 200 by using the license management device unique key which is held by the unique information managing unit 107.

S2203: the license accumulation control unit 102 calculates a hash value of the data in which the license management device unique key is combined with the license 200 whose content key 206 has been encrypted in Step S2202. The license accumulation control unit 102 adds the hash value, as the tamper-resistant information 401, to the license 200.

Further, in the case where the usage rule designates whether or not the license can be transferred, the operations of the processing of determining whether or not the stateless license is reproducible, which is performed by the content reproduction control unit 111 is partly different from the ones in the flowchart as illustrated in FIG. 9. The different parts are processing of a prestage of Step S901, and processings in Step S901 and Step S904. First, the content reproduction control unit 111 determines which of the license management device unique key or the domain key is to be combined with the license 200 for calculating a hash value by referring to encryption key information 2101 illustrated in FIG. 21, prior to determining, in Step S901, whether or not the license 200 has been tampered.

S901: in the case where the hash value is calculated by combining the license 200 with the domain key, the operation illustrated in Step S901 of FIG. 9. is carried out In the case where the license management device unique key is combined with the license 200 for calculating the hash value, different operations are carried out. In this case, the content reproduction control unit 111 reads the license management device unique key from the unique information managing unit 107 and combines the unique key to the license 200. Then, the content reproduction control unit 111 calculates a hash value of the data in which the license management device unique key is combined with the license 200. The content reproduction control unit 111 compares the hash value with the tamper-resistant information 401 which is added to the license 200. The content reproduction control unit 111 determines that the license has not been tampered with in the case where the values agree with according to the comparison result, and that the license has been tampered with in the case where the values do not agree according to the comparison result. Subsequent processings through Step S903 are the same as respective steps described in FIG. 9.

S904: in the case where the license 200 has been encrypted with the domain key, the same operation as illustrated in Step S904 of FIG. 9 is carried out. In the case where the license 200 has been encrypted with the license management device unique key, the content reproduction control unit 111 retrieves the content key 206 from the license 200 and decrypts the content key 206 by using the license management device unique key which is held by the unique information managing unit 107.

Figure 23:
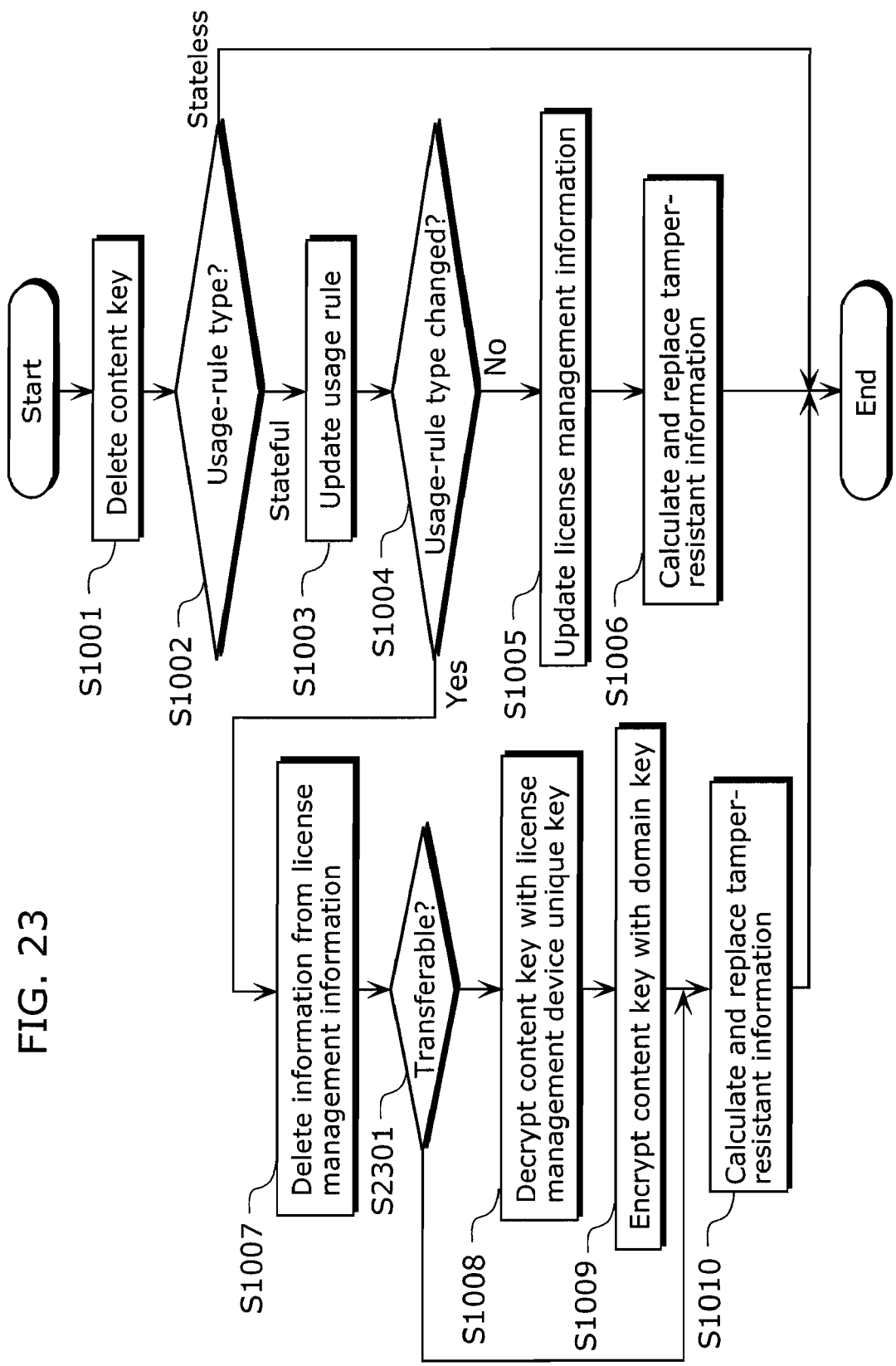
FIG. 23 is a flowchart illustrating operations of processing after termination of content reproduction in the case where a usage rule designates whether or not the license is transferable.

FIG. 23 is a flowchart illustrating operations of the processing after termination of content reproduction in the case where a usage rule designates whether or not the license can be transferred. Among the operations performed by the license management device 100 in the processing after termination of content reproduction, processings which differ between FIG. 23 and FIG. 10 are the ones in Steps S2301 and S1010 of FIG. 23. More specifically, the different processings are the processings to be performed subsequent to Step 1007 of FIG. 10 where the content reproduction control unit 111 deletes information regarding the license 200 used for reproducing the content from the license management information 300 which is managed by the license management information managing unit 109. The content reproduction control unit 111 performs the processing of Step S2301 prior to the processing of Step S1008.

S2301: the content reproduction control unit 111 identifies the usage rule 205 of the license 200. In the case where the usage rule 205 is "transferable", the process advances to Step S1008. In the case where the usage rule 205 is "not transferable", the process advances to Step S1010.

S1010: the content reproduction control unit 111 performs, on the license 200 whose content key 206 has been encrypted in Step S1009, the same processing as described in Step S1010 of FIG. 10. The content reproduction control unit 111 calculates, when the license 200 has the usage rule 205 which has been identified as "not transferable" in Step S2301, a hash value of the data in which only the license management device unique key is combined with the license 200. The content reproduction control unit 111 replaces the existing tamper-resistant information 401 with the calculated value as new tamper-resistant information 401.

Figure 24:
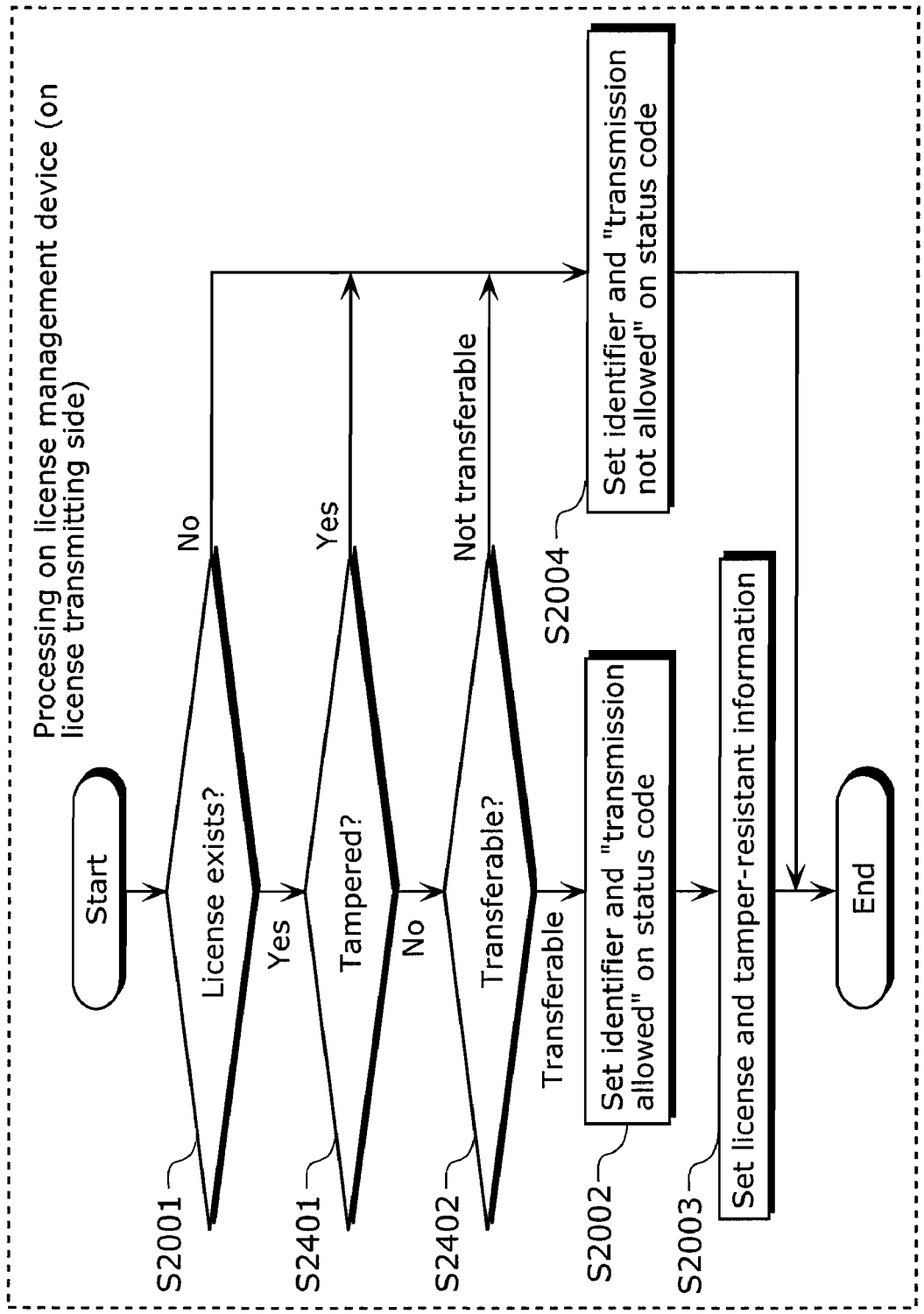
FIG. 24 is a flowchart illustrating operations of processing for generating a transmission request for a stateless license in the case where a usage rule designates whether or not the license is transferable.

FIG. 24 is a flowchart illustrating operations of processing for generating a response to a transmission request for the stateless license in the case where the usage rule designates whether or not the license can be transferred. Among the operations performed by the license management device 100 in the processing for generating a response to a transmission request for a stateless license, processings different between FIG. 24 and FIG. 20 are the processings in Steps S2401 and S2402 of FIG. 24. More specifically, these are the processes to be performed subsequent to Step 2001 of FIG. 20, in the case where it is determined by the license-transmitting transfer unit (transfer method B) 105 in Step S2001 of FIG. 20 that the license 200 which is requested for transmission has been accumulated in the license accumulation unit 110. The license-transmitting transfer unit (transfer method B) 105 performs the processings of Steps S2401 and S2402 prior to the processing of Step S2002.

S2401: the license-transmitting transfer unit (transfer method B) 105 determines whether or not the license 200 which is requested for transmission has been tampered. More specifically, the license-transmitting transfer unit (transfer method B) 105 calculates a hash value of the data in which the license management device unique key is combined with the license 200, in the case where the content key 206 of the license 200 accumulated in the license accumulation unit 110 has been encrypted with the license management device unique key. The license-transmitting transfer unit (transfer method B) 105 compares the hash value with the value of the tamper-resistant information 401 which is added to the license 200. The license-transmitting transfer unit (transfer method B) 105 selects the domain key which has been stored in combination with the domain ID 203 of the license 200 which is requested for transmission from among domain keys held by the domain information managing unit 108, in the case where the content key 206 of the license 200 accumulated in the license accumulation unit 110 has been encrypted with the domain key. Further, the license-transmitting transfer unit (transfer method B) 105 calculates a hash value of the data in which the selected domain key is combined with the license 200, and compares the hash value with the tamper-resistant information 401 which is added to the license 200. The license-transmitting transfer unit (transfer method B) 105 determines that the license has not been tampered with in the case where the values agree according to the comparison result, and that the license has been tampered with in the case where the values do not agree according to the comparison result. In the case where the license has not been tampered with according to the determination, the process advances to Step S2402. In the case where the license has been tampered with, the process advances to Step S2004.

S2402: the license-transmitting transfer unit (transfer method B) 105 refers to the usage rule 205 of the license 200 to determine whether or not transfer is allowed. In the case where transfer is allowed, the process advances to Step S2002. In the case where transfer is not allowed, the process advances to Step S2004.

(Other Modifications) Note that, although the present invention has been described in accordance with the embodiment mentioned above, it is apparently understood that the present invention is not limited to the aforementioned embodiment. The present invention includes following modifications and the like.

(1) each of the above-described units is, specifically, a computer system including: a microprocessor; a ROM; a RAM; a hard disk unit; a display unit; a keyboard; a mouse; and the like. A computer program is stored in the RAM or the hard disk unit. The function of each device is achieved by the operations of the microprocessor according to the computer program. Here, the computer program is structured by combining plural instruction codes which indicate instructions on the computer so that predetermined functions are achieved.

(2) Part of or all of the constituent elements which make Lip each of the above-mentioned devices may be structured by a single system LSI (Large Scale Integration). The system LSI is a super-multifunction LSI manufactured by integrating plural constituent parts into a single chip and, more specifically, a computer system configured by including the microprocessor, the ROM, and the RAM. The RAM stores a computer program. The function of the system LSI is achieved by the operations of the microprocessor according to the computer program.

(3) Part of or all of the constituent elements which make up each of the above-mentioned devices may be structured by: an IC card which is detachable to each device; or a single module. The IC card or the module is a computer system including: a microprocessor; a ROM; a RAM; and the like. The IC card or the module may include the above-mentioned super-multifunction LSI. The function of the IC card or the module is achieved by the operations of the microprocessor according to the computer program. The IC card or the module may be tamper-resistant.

(4) The present invention may be a method corresponding to the above. Further, the invention may be: a computer program executed by a computer; or a digital signal which represents a computer program.

Further, the invention may be a computer-readable recording medium in which the computer program or the digital signal is recorded. The recording medium includes for example: a flexible disk; a hard disk; a CD-ROM; a MO; a DVD; a DVD-ROM; a DVD-RAM; a BD (Blu-ray Disc); a semiconductor memory; and the like. Further, the present invention may be the digital signal(s?) recorded on these recording media.

Further, the computer program and the digital signal of the present invention may be transmitted via: an electric communications line; a wireless communications line or a wired communications line; a network represented by the Internet; a data broadcast; and the like.

Further, the present invention may be a computer system provided with: a microprocessor which operates according to the computer program; and a memory which stores the computer program.

Further, the program or the digital signal may be executed by another independent computer system by: recording the program or the digital signal on the recording medium for transmission; or transmitting the program or the digital signal via the network and the like.

(5) The embodiment mentioned above and aforementioned each modification may be combined respectively.

INDUSTRIAL APPLICABILITY

The license management device and method according to the present invention is useful as, for example, a receiving terminal for content distributing service via digital broadcasting, CATV, and the Internet or as a receiving terminal for content distributing service using a package medium such as a DVD.

The invention claimed is:

1. A license management device which manages a license, the license being information which indicates a right to use a content under a predetermined usage rule, said license management device comprising:
   a license type identifying unit programmed to identify a license type which represents whether or not a license includes a usage rule which requires updating each time a content is used;
   a license accumulation unit programmed to perform different accumulation processing, depending on whether or not the license includes a usage rule which requires updating each time a content is used;
   a unique information managing unit programmed to hold a unique key which is unique to said license management device;
   a domain information managing unit programmed to hold a domain key held in common with said device and another license management device within a domain that consists of a plurality of predetermined license management devices;
   a content decrypting/reproducing unit programmed to use the content in accordance with the usage rule included in the license; and
   a license-type change determining unit programmed to determine whether or not the license type identified by said license type identifying unit has changed due to the use of a content by said content decrypting/reproducing unit,
   wherein said license accumulation unit includes a license accumulation control unit programmed to encrypt the license, as the accumulation processing: by using the unique key, which is held by said unique information managing unit, in a case where the license includes the usage rule which requires updating each time a content is used; and by using the domain key, which is held by said domain information managing unit, in a case where the license does not include the usage rule which requires updating each time a content is used,
   the different accumulation processing is processing for accumulating the license encrypted by said license accumulation control unit, and
   said license accumulation control unit is programmed to;
      determine that the license type has changed due to updating the usage rule included in the license, and
      in response to the determined license type change, decrypt the license by using a key conforming to the type before the change, and then encrypt the license by using a key conforming to the type after the change.

2. The license management device according to claim 1, further comprising:
   a secure management unit which includes a storage area in which information for preventing tampering with the license accumulated in said license accumulation unit is securely recorded,
   wherein said license accumulation unit is programmed to record, on said secure management unit, the information for preventing tampering in the case where the license includes the usage rule which requires updating each time a content is used, and does not record, on said secure management unit, the information for preventing tampering in the case where the license does not include the usage rule which requires updating each time a content is used.

3. The license management device according to claim 2, further comprising:
   an updating unit programmed to update the usage rule included in the license each time a content is used, in the case where the license includes the usage rule which requires updating each time a content is used; and
   an updating number of times generating unit programmed to generate information of the number of times of update each time said updating unit updates the usage rule which requires updating each time a content is used, the information indicating the number of times that the license has been updated,
   wherein the information for preventing tampering is the information of updating number of times.

4. The license management device according to claim 1, further comprising:
   a secure transmitting and receiving unit, programmed to transmit and receive the license accumulated in said license accumulation unit by establishing a secure data transmission channel between an other license management device;
   a transmitting and receiving unit programmed to transmit and receive the license accumulated in said license accumulation unit via a regular data transmission channel with the other license management device; and
   a transmitting and receiving control unit programmed to control transmitting and receiving the license with the other license management device,
   wherein: said license accumulation unit is programmed to encrypt the license by using the domain key and then accumulate the license, as the accumulation processing, in a case where the license does not include the usage rule which requires updating each time a content is used; and
   said transmitting and receiving control unit is programmed to transmit and receive: the license by using said secure transmitting and receiving unit in a case where the license includes the usage rule which requires updating each time a content is used; and the license encrypted with the domain key by using said transmitting and receiving unit in the case where the license does not include the usage rule which requires updating each time a content is used.

5. A license managing method used for a license management device for managing a license, the license being information which indicates a right to use a content under a predetermined usage rule, said license managing method comprising:
   a holding step of holding, by a unique information managing unit, a unique key which is unique to the license management device;

a holding step of holding, by a domain information managing unit, a domain key held in common with the device and another license management device within a domain that consists of a plurality of predetermined license management devices, a license type identifying step of identifying a license type which represents whether or not a license includes a usage rule which requires updating each time a content is used;

a license accumulating step of performing different accumulation processing, depending on whether or not the license includes a usage rule which requires updating each time a content is used;

a content decrypting/reproducing step of using the content in accordance with the usage rule included in the license;

a license-type change determining step of determining whether or not the license type identified in said license type identifying step has chanced due to the use of the content in said content decrypting/reproducing step, wherein said license accumulating step includes a license accumulation control step of encrypting the license, as the accumulation processing: by using the unique key, which is held by the unique information managing unit, in a case where the license includes the usage rule which requires updating each time a content is used; and by using the domain key, which is held by the domain information managing unit, in a case where the license does not include the usage rule which requires updating each time a content is used, and wherein the different accumulation processing is processing for accumulating the license encrypted in said license accumulation control step;

determining that the license type has changed due to updating the usage rule included in the license; and in response to the determined license type change, decrypting the license, in said license accumulation control step, by using a key conforming to the type before the change, and then encrypting the license, in said license accumulation control step, by using a key conforming to the type after the change.

6. The license managing method for managing the license according to claim 5, said license managing method further comprising:

a secure transmitting and receiving step of transmitting and receiving the license accumulated in said license accumulating step by establishing a secure data transmission channel between another license management device;

a transmitting and receiving step of transmitting and receiving the license accumulated in said license accumulating step via a regular data transmission channel with the other license management device; and a transmitting and receiving controlling step of controlling transmitting and receiving the license with the other license management device, wherein in said license accumulating step, the license is encrypted by using the domain key and then accumulated, as the accumulation processing, in a case where the license does not include the usage rule which requires updating each time a content is used; and in said transmitting and receiving controlling step, the transmitting and receiving is controlled so that the transmitting and receiving of the license is performed using said secure transmitting and receiving step in a case where the license includes the usage rule which requires updating each time a content is used, and the transmitting and receiving of the license encrypted with the domain key is performed using said transmitting and receiving step in a case where the license does not include a usage rule which requires updating each time the content is used.

7. A computer program which manages a license, embodied on a non-transitory computer readable recording medium, the license being information which indicates a right to use a content under a predetermined usage rule, said computer program when executed by a computer, performs a method comprising;

holding, by a unique information managing unit unique key which is unique to the license management device; and holding, by a domain information managing, domain key held in common with the device and another license management device within a domain that consists of a plurality of predetermined license management devices;

a license type identifying step of identifying a license type which represents whether or not the license includes a usage rule which requires updating each time a content is used; and a license accumulating step of performing different accumulation processing, depending on whether or not the license includes the usage rule which requires updating each time a content is used;

a content decrypting/reproducing step of using the content in accordance with the usage rule included in the license;

a license-type change determining step of determining whether or not the license type identified in said license type identifying step has changed due to the use of the content in said content decrypting/reproducing step, wherein the license accumulating step includes a license accumulation control step of encrypting the license, as the accumulation processing: by using the unique key, which is held by the unique information managing unit, in a case where the license includes the usage rule which requires updating each time a content is used; and by using the domain key, which is held by the domain information managing unit, in a case where the license does not include the usage rule which requires updating each time a content is used, and wherein the different accumulation processing is processing for accumulating the license encrypted in said license accumulation control step;

determining that the license type has changed due to updating the usage rule included in the license; and in response to the determined license type change, decrytpting the license, in said license accumulation control step, by using a key conforming to the type before the change, and then encrypting the license, in said license accumulation control step, by using a key conforming to the type after the change.

* * * * *